(12) United States Patent
Gorkovenko et al.

(10) Patent No.: US 6,201,100 B1
(45) Date of Patent: Mar. 13, 2001

(54) ELECTROACTIVE, ENERGY-STORING, HIGHLY CROSSLINKED, POLYSULFIDE-CONTAINING ORGANIC POLYMERS AND METHODS FOR MAKING SAME

(75) Inventors: Alexander Gorkovenko; Terje A. Skotheim, both of Tucson, AZ (US)

(73) Assignee: Moltech Corporation, Tucson, AZ (US)

( * ) Notice: Subject to any disclaimer, the term of this patent is extended or adjusted under 35 U.S.C. 154(b) by 0 days.

(21) Appl. No.: 08/995,122

(22) Filed: Dec. 19, 1997

(51) Int. Cl.$^7$ .............................. C08G 75/16; H01M 4/60
(52) U.S. Cl. ........................ 528/388; 528/381; 528/397; 429/213
(58) Field of Search .................... 429/213; 528/381, 528/388, 397

(56) References Cited

U.S. PATENT DOCUMENTS

| | | |
|---|---|---|
| 2,466,963 | 4/1949 | Patrick et al. . |
| 3,532,543 | 10/1970 | Nole et al. . |
| 3,907,591 | 9/1975 | Lauck . |
| 3,953,231 | 4/1976 | Farrington et al. . |
| 4,025,495 * | 5/1977 | Peerts et al. . |
| 4,143,214 | 3/1979 | Chang et al. ........................ 429/112 |
| 4,152,491 | 5/1979 | Chang et al. ........................ 429/112 |
| 4,469,761 | 9/1984 | Bennett et al. ........................ 429/50 |
| 4,608,433 | 8/1986 | Meyer et al. ........................ 528/388 |
| 4,664,991 | 5/1987 | Perichaud et al. ................... 429/194 |
| 4,739,018 | 4/1988 | Armand et al. ..................... 525/326.2 |
| 4,833,048 | 5/1989 | De Jonghe et al. ................. 429/104 |
| 4,917,974 | 4/1990 | De Jonghe et al. ................. 429/104 |
| 5,155,275 | 10/1992 | Shaw ...................................... 568/21 |
| 5,162,175 * | 11/1992 | Visco et al. ...................... 429/213 X |
| 5,256,742 | 10/1993 | Sattich et al. ........................ 525/537 |
| 5,432,257 * | 7/1995 | Lee et al. ............................. 528/373 |
| 5,441,831 | 8/1995 | Okamoto et al. .................... 429/213 |
| 5,464,931 | 11/1995 | Shaw et al. .......................... 528/389 |
| 5,516,598 * | 5/1996 | Visco et al. ..................... 429/213 X |
| 5,523,179 | 6/1996 | Chu ...................................... 429/104 |
| 5,529,860 | 6/1996 | Skotheim et al. ................... 429/213 |
| 5,530,163 | 6/1996 | Shaw ...................................... 568/26 |
| 5,538,812 | 7/1996 | Lee et al. ............................. 429/192 |
| 5,565,517 | 10/1996 | Efner et al. .......................... 524/714 |
| 5,601,947 | 2/1997 | Skotheim et al. ................... 429/213 |
| 5,690,702 | 11/1997 | Skotheim et al. ................. 29/623.1 |
| 5,723,230 * | 3/1998 | Naoi et al. ........................... 429/104 |

FOREIGN PATENT DOCUMENTS

| | | |
|---|---|---|
| 9-139213 | 5/1997 | (JP) . |
| WO 96/41388 | 12/1996 | (WO) . |

OTHER PUBLICATIONS

Chemical Abstracts, Columbus, OH, U.S., Abstract No. 127:53469, "Sulfide–type electrode materials and secondary batteries" corresponding to JP 9–139213 A2. (May 1997).

(List continued on next page.)

Primary Examiner—Stephen Kalafut
Assistant Examiner—Jonathan Crepeau
(74) Attorney, Agent, or Firm—Morrison & Foerster LLP

(57) ABSTRACT

The present invention pertains to electroactive, energy-storing, highly crosslinked organic polymers and copolymers with a carbocyclic repeat unit comprising a non-aromatic carbocycle with from 3 to 12 ring carbon atoms, wherein each repeat unit is covalently linked via divalent polysulfide linkages having the formula, $-S_m-$, where m is the same or different at each occurrence and is an integer from 3 to 10. The present invention also pertains to methods of making such polymers and copolymers, which methods generally comprise reacting an alkali metal polysulfide with a halogen-substituted carbocyclic precursor.

9 Claims, 5 Drawing Sheets

OTHER PUBLICATIONS

WPINDEX Abstract, Derwent Information Ltd., Accession No. 97–33918 [31], "Electrode material for sec. battery—contains organic electrode material based on an organic poly sulphide compound" corresponding to JP 9–139213 A. (May 1997).

Kavan, L.; Novak, P. and Dousek, F., "Electrochemistry of Sulphur Adsorbed on Carbon", *Electrochim. Acta*, vol. 33, No. 11, pp. 1605–1612 (1988). (Month N/A).

Liu, M., Visco, S. and De Jonghe, L., "All–Solid–State Thin–Film Rechargeable Lithium Batteries Using Solid Redox Polymerization Electrodes", *Proc.—Electrochem. Soc.*, vol. 90–5 (Proc. Symp. Rechargeable Lithium Batteries, 1989), pp. 220–232 (1990). (Month N/A).

Liu, M., Visco, S. and De Jonghe, L., "Novel Solid Redox Polymerization Electrodes: All–Solid–State, Thin–Film, Rechargeable Lithium Batteries", *J. Electrochem. Soc.*, vol. 138, No. 7, pp. 1891–1895. (Jul. 1991).

Naoi, K.; Kawase, K. and Inoue, Y., "A New Energy Storage Material: Organosulfur Compounds Based on Multiple Sulfur–Sulfur Bonds",*J. Electrochem. Soc.*, vol. 144, No. 6, pp. L170–L172. (Jun. 1997).

Naoi, K.; Kawase, K. and Inoue, Y., "Polysulfide Compounds as High Energy Cathode of Lilthium Batteries", *Proc.—Electrochem. Soc.*, vol. 96–14 (Exploratory Research and Development of Batteries for Electric and Hybrid Vehicles), pp. 131–138. (Oct. 1996).

Naoi, K.; Mori, M; Kawase, K.; Inoue, Y. and Komiyama, M., "A New Organosulfur Compounds in Lithium Batteries: Poly(Tri–, Tetra–sulfide) and Poly(2,2'–Dithiodianiline)", *Proceedings of the 1997 Joint International Meeting of the Electrochemical Society and the International Society of Electrochemistry*, Paris, France, Aug. 31–Sep. 5, 1997, Abstract No. 142, p. 165.

Novak, P.; Mueller, K.; Santhanam, K. and Haas, O., "Electrochemically Active Polymers for Rechargeable Batteries", *Chem. Rev.* (Washington, D.C.), vol. 97, No. 1, pp. 207–281 (1997). (Month N/A).

Peled, E.; Gorenshtein, A.; Segal, M. and Sternberg, Y., "Rechargeable Lithium–Sulfur Battery (Extended Abstract)", *J. Power Sources*, vol. 26, Nos. 3/4, pp. 269–271. (May 1989).

Rauh, R.; Abraham, K., Pearson, G.; Surprenant, J. and Brummer, S., "A Lithium/Dissolved Sulfur Battery with an Organic Electrolyte", *J. Electrochem. Soc.*, vol. 126, No. 4, pp. 523–527 (1979). (Month N/A).

Yamin, H.; Gorenshtein, A.; Penciner, J.; Sternberg, Y. and Peled, E., "Lithium Sulfur Battery. Oxidation/Reduction Mechanisms of Polysulfides in THF Solutions", *J. Electrochem. Soc.*, vol. 135, No. 5, pp. 1045–1048. (May 1988).

* cited by examiner

ELECTROACTIVE, ENERGY-STORING, HIGHLY CROSSLINKED, POLYSULFIDE-CONTAINING ORGANIC POLYMERS AND METHODS FOR MAKING SAME

TECHNICAL FIELD

The present invention pertains generally to the field of electroactive cathode materials for electrochemical cells. More particularly, the present invention pertains to cathode materials which comprise an electroactive, energy-storing, highly crosslinked polysulfide-containing organic polymer, wherein said polymer comprises a plurality of repeat units comprising a carbocycle having from 3 to 12 ring carbon atoms, which are covalently linked via polysulfide linkages of the formula, —$S_m$—, wherein m is an integer from 3 to 10. The present invention also pertains to composite cathodes comprising such polymers; electrochemical cells comprising such cathodes; and to methods of making such polymers, composite cathodes and cells.

BACKGROUND

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which this invention pertains.

As the evolution of batteries continues, and particularly as lithium batteries become more widely accepted for a variety of uses, the need for safe, long lasting high energy batteries becomes more important. There has been considerable interest in recent years in developing high energy density cathode-active materials for use in high energy primary and secondary batteries with alkali-metal anode materials. Several types of cathode materials for the manufacture of thin film lithium and sodium batteries are known in the art. Of considerable interest are cathode materials comprising sulfur-sulfur bonds, wherein high energy capacity and rechargeability are achieved from the electrochemical cleavage (via reduction) and reformation (via oxidation) of these bonds. Sulfur containing cathode materials disclosed for use in lithium and sodium batteries comprise elemental sulfur, organo-sulfur, and carbon-sulfur compositions.

Elemental sulfur is an attractive cathode material in alkali-metal batteries owing to its low equivalent weight, low cost, and low toxicity. Many alkali-metal/sulfur battery cells have been described, as for example, in U.S. Pat. Nos. 3,532,543; 3,907,591; 3,953,231; 4,469,761; 5,532,179; Rauh et al., *J. Electrochem. Soc.* 1979, 126(4), 523–527; Yamin et cr., *J. Electrocheem. Soc.* 1988, 135(5), 1045–1048; and Peled, et cil., *J. of Power Sources* 1989, 26, 269–271.

Many problems with alkali metal/elemental sulfur battery cells have been discovered. One pertains to alkali-metal sulfides formed at the positive electrode on discharge, reacting with elemental sulfur to produce polysulfides that are soluble in the electrolyte causing self-discharge, cell separator clogging, and loss of cell capacity. Another problem is that alkali-metal sulfides once reoxidized on cell charge may lead to the formation of an insulating layer on the positive electrode surface which electrochemically and ionically isolates it from the electroactive elements in the cell, resulting in poor cell reversibility and loss of capacity. The electrically and ionically non-conductive properties of sulfur are a major obstacle that is difficult to overcome in cells comprising elemental sulfur.

Many attempts have been made to improve the electrochemical accessibility of elemental sulfur in cathodes by adsorbing sulfur onto conductive carbons, as extensively reviewed by Kavan et cil., in *Electrochimica Acta* 1988, 33, 1605–1612, or by complexing elemental sulfur with conjugated (conductive) polymers as described in U.S. Pat. No. 4,664,991 to Pcrichaud et al. Derivatives of polyacetylene and sulfur are described in U.S. Pat. No. 4,739,018 to Armand et al. and extensively reviewed by Novak et al. in *Chem. Rev.* 1997, 97, 207–281.

Further types of sulfur-containing cathode materials are $C_vS$ materials characterized as surface compounds of carbon with variable compositions, where v is in the range of 4 to 50, as described in U.S. Pat. No. 4,143,214 to Chang et al. U.S. Pat. No. 4,152,491 to Chang et al. relates to the cathode-active materials which include one or more polymer compounds having a plurality of carbon monosulfide units.

U.S. Pat. Nos. 4,833,048 and 4,917,974 to De Jonghe et al. describe a class of cathode materials made of organosulfur compounds of the formula $(R(S)_y)_n$ where y=1 to 6; n=2 to 20, and R is one or more different aliphatic or aromatic organic moieties having one to twenty carbon atoms. One or more oxygen, sulfur, nitrogen or fluorine atoms associated with the chain can also be included when R is an aliphatic chain. The aliphatic chain may be linear or branched, saturated or unsaturated. The aliphatic chain or the aromatic rings may have substituent groups. The preferred form of the cathode material is a simple dimer or $(RS)_2$. When the organic moiety R is a straight or a branched aliphatic chain, such moieties as alkyl, alkenyl, alkynyl, alkoxyalkyl, alkythioalkyl, or aminoalkyl groups and their fluorine derivatives may be included. When the organic moiety comprises an aromatic group, the group may comprise an aryl, arylalkyl or alkylaryl group, including fluorine substituted derivatives, and the ring may also contain one or more nitrogen, sulfur, or oxygen heteroatoms as well.

In the cell developed by De Jonghe et al., the main cathode reaction during discharge of the battery is the breaking and reforming of disulfide bonds. The breaking of a disulfide bond is associated with the formation of an $RS^-M^+$ ionic complex. The organo-sulfur materials investigated by De Jonghe et al. undergo polymerization (dimerization) and de-polymerization (disulfide cleavage) upon the formation and breaking of the disulfide bonds. The de-polymerization which occurs during the discharging of the cell results in lower molecular weight polymeric and monomeric species, namely soluble anionic organic sulfides, which can dissolve into the electrolyte and cause self-discharge as well as reduced capacity, thereby severely reducing the utility of the organo-sulfur material as a cathode-active material and eventually leading to complete cell failure. The result is an unsatisfactory cycle life having a maximum of about 200 deep discharge-charge cycles, more typically less than 100 cycles as described in *J. Electrochem. Soc.* 1991, 138. 1891–1895.

U.S. Pat. No. 5,441,831 to Okamoto et al. relates to an electric current producing cell which comprises a cathode containing one or more carbon-sulfur compounds of the formula $(CS_x)_n$, in which x takes values from 1.2 to 2.3 and n is equal to or greater than 2.

Many molecular and polymeric disulfides for use in batteries have been described in a recent review article by Novak et al. (*Chem. Rev.* 1997, 97, 207–281). The polymeric disulfide polymers generally exhibit slower electrochemical kinetics than the molecular (soluble) organo-disulfide materials. A clear preference for linear disulfide polymers in cathodes was disclosed by Liu et al., (*Electrochemical Society Proceedings,* 1990, 90–5, 220), wherein crosslinked and ladder type polydisulfide polymers exhibited inferior performance.

Energy storage by the reversible cleavage and reformation of sulfur-sulfur bonds has been reported for organic and polymeric compounds comprising polysulfide, —$S_m$— (trisulfide, tetrasulfide, pentasulfide, etc.) moieties. Owing to the presence of multiple linked sulfur atoms in these molecules, they possess higher energy densities than the corresponding molecules containing the disulfide linkage, —S—S—, alone. Skotheim et. el. in U.S. Pat. Nos. 5,601,947, 5,609,702 and 5,529,860, and in U.S. Pat. application Ser. No. 08/602,323 have disclosed that improved capacity and cycleability can be achieved by using cathode active carbon-sulfur cathode polymer materials comprising polysulfide moieties. U.S. Pat. No. 5,529,860 and U.S. Pat. application Ser. No. 08/602,323, now, abandoned describe polyacetylene-co-polysulfur compositions of general formula $(C_2S_x)_n$, wherein x is greater than 1 to about 100 and n is equal to or greater than 2. U.S. Pat. Nos. 5,601,947 and 5,609,702 describe carbon-sulfur polymer materials of general formula $(CS_x)_n$, wherein x is greater than 2.3 to about 50 and n is equal to or greater than 2, which in their oxidized state, comprise a polysulfide moiety of the formula, —$S_m$—, wherein m is an integer equal to or greater than 3. The polyacetylene-co-polysulfur and the carbon-sulfur polymer materials may comprise covalently bound polysulfide, —$S_m$—, sidechains on the polymer backbone chain, as well as polysulfide, —$S_m$—, main chain linkages in the polymer backbone.

Naoi et al. (*Electrochemical Society Proceedings,* 1996, 14, 131–138, Abstract No. 142, Joint International Meeting of Electrochemical Society and International Society of Electrochemistry, Paris, Aug. 21–Sep. 5, 1997, *J Electrochem. Soc.* 1997, 144(6), L1170–172 and Japanese Patent Application No. 09-139213, published May 27, 1997) have recently reported higher discharge capacities for the molecular trisulfide and tetrasulfide dimers and polymers compared to the corresponding disulfide dimers and polymers. However, they also observed that charge retention (capacity) on electrochemical cycling of the trisulfide and tetrasulfide compounds was less than that of the disulfide dimers.

Despite the various approaches proposed for the fabrication of high energy density rechargeable cells containing elemental sulfur, organo-sulfur and carbon-sulfur cathode materials, or derivatives and combinations thereof, there remains a need for materials that improve the utilization of electroactive cathode materials and the cell efficiencies and provide rechargeable cells with high sustainable capacities over many cycles.

It is therefore an object of the present invention to provide composite cathodes containing high loadings of electroactive sulfur-containing cathode material that exhibit a high utilization of the available electrochemical energy and retain this energy capacity without significant loss over many charge-discharge cycles.

It is another object of the present invention to provide high sulfur content polymers and copolymers useful as cathode materials with high surface area and open structures that exhibit high charge and discharge rates, and to provide processes for making such high sulfur content polymers and copolymers.

It is a further object of this invention to provide methods for fabricating cathode elements comprising the high sulfur content polymers and copolymers of the present invention.

It is yet a further objective of this invention to provide energy-storing rechargeable battery cells which incorporate such composite cathodes, and which exhibit much improved self-discharge characteristics, long shelf life, improved capacity, and high manufacturing reliability.

SUMMARY OF THE INVENTION

The present invention pertains to electroactive, energy-storing, highly crosslinked organic polymers, said polymers comprising a plurality of carbocyclic repeat units which are covalently linked via polysulfide linkages; each of said carbocyclic repeat units comprising a carbocycle having from 3 to 12 ring carbon atoms and from 3 to 22 covalent linkages to adjacent carbocyclic repeat units; and, each of said polysulfide linkages comprising a divalent polysulfide moiety having the formula, —$(S_m)$—, wherein m is an integer from 3 to 10 and is the same or different at each occurrence.

In another embodiment, the electroactive, energy-storing, highly crosslinked organic polymers, comprise polymeric segments of the formula

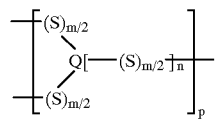

wherein:
Q denotes a carbocyclic repeat unit comprising a carbocycle having from 3 to 12 ring carbon atoms;
S denotes a sulfur atom;
m is the number of sulfur atoms in a given polysulfide linkage, is an integer from 3 to 10, and is the same or different at each occurrence;
n denotes the number of crosslinking polysulfide linkages, is an integer from 1 to 20, and is the same or different at each occurrence; and,
p is an integer greater than 1.

In one embodiment of the invention, the carbocyclic repeat unit, Q, comprises a carbocycle having from 4 to 8 ring carbon atoms. In one embodiment of the invention, the carbocyclic repeat unit, Q, comprises a carbocycle having from 5 to 6 ring carbon atoms. In a preferred embodiment of the invention, the carbocyclic repeat unit, Q, comprises a carbocycle having 5 ring carbon atoms. In a more preferred embodiment of the invention, the carbocyclic repeat unit, Q, is a carbocycle with 5 ring carbon atoms.

In one embodiment of the invention, the carbocyclic repeat unit comprises a carbocycle having one or more unsaturated bonds.

In one embodiment of the invention, the polysulfide linkages comprise a divalent polysulfide moiety having the formula, —$(S_m)$—, wherein m is an integer from 3 to 6 and is the same or different at each occurrence.

In one embodiment, the carbocyclic repeat unit, Q, comprises two carbocycles, each having from 3 to 12 ring carbon atoms, said two carbocycles being linked by one carbon-carbon bond. In another embodiment, the carbocyclic repeat unit, Q, comprises two carbocycles, each having from 3 to 12 ring carbon atoms, said two carbocycles being linked by two carbon-carbon bonds. In a preferred embodiment the two carbocycles each comprise 5 ring carbon atoms.

In one embodiment, the electroactive, energy-storing, highly crosslinked organic polymers of the present invention have greater than 78% by weight sulfur, and preferably has greater than 85% by weight sulfur.

In another embodiment, the electroactive, energy-storing, highly crosslinked polymer of the present invention is a copolymer, said copolymer comprising two or more different carbocyclic repeat units which are covalently linked via polysulfide linkages; each of said carbocyclic repeat units comprising a carbocycle having from 3 to 12 ring carbon atoms and from 3 to 20 covalent linkages to adjacent carbocyclic repeat units; and, each of said polysulfide linkages comprising a divalent polysulfide moiety having the formula, —$(S_m)$—, wherein m is an integer from 3 to 10 and is the same or different at each occurrence.

In another embodiment, the electroactive, energy-storing, highly crosslinked polymer of the present invention is a copolymer, said copolymer comprising a carbocyclic repeat unit and a non-carbocyclic repeat unit which are covalently linked via polysulfide linkages; each of said carbocyclic repeat units comprising a carbocycle having from 3 to 12 ring carbon atoms and from 3 to 20 covalent linkages to one or more adjacent carbocyclic or non-carbocyclic repeat units; and each of said polysulfide linkages comprising a divalent polysulfide moiety having the formula, —$(S_m)$—, wherein m is an integer from 3 to 10 and is the same or different at each occurrence.

In one embodiment of the copolymer of this invention, the non-carbocyclic repeat unit comprises a non-cyclic alkyl or alkenyl group covalently linked via two or more polysulfide linkages to one or more of said carbocyclic or non-carbocyclic repeat units. In a preferred embodiment, the non-carbocyclic repeat unit is a propyl group covalently linked via polysulfide linkages at each of its three carbons.

Another aspect of the present invention pertains to methods of making the electroactive, energy-storing, highly crosslinked polymers of the present invention. In one embodiment, said polymer is made by the condensation of:

(a) a halogen substituted precursor comprising a carbocycle having from 3 to 12 ring carbon atoms and at least three halogen substituents, wherein said halogen substituents are the same or different at each occurrence and are one or more halogens selected from the group consisting of chlorine, bromine and iodine; and, (b) an alkali-metal polysulfide, $M_2S_m$, wherein M is an alkali metal selected from the group consisting of lithium, sodium, potassium, and cesium, and m is an integer from 3 to 10.

In another embodiment of the methods, the electroactive, energy-storing, highly crosslinked polymer is made by the condensation of hexachlorocyclopentadiene with a sodium polysulfide, wherein said sodium polysulfide is one or more selected from the group consisting of: sodium trisulfide, sodium tetrasulfide, sodium pentasulfide, sodium hexasulfide, sodium heptasulfide, and sodium octasulfide.

In another embodiment of the methods, the electroactive, energy-storing, highly crosslinked organic polymer is made by the condensation of 1,2,3,4,5-pentachloro-5-(1,2,3,4,5-pentachloro-cyclopenta-2,4-dienyl)cyclopenta-1,3-diene with a sodium polysulfide, wherein said sodium polysulfide is one or more selected from the group consisting of: sodium trisulfide, sodium tetrasulfide, sodium pentasulfide, sodium hexasulfide, sodium heptasulfide, and sodium octasulfide.

In one embodiment of the methods, the electroactive, energy-storing, highly crosslinked copolymer of the present invention is made by the condensation of hexachlorocyclopentadiene and 1,2,3-trichloropropane with a sodium polysulfide, wherein said sodium polysulfide is one or more selected from the group consisting of: sodium trisulfide, sodium tetrasulfide, sodium pentasulfide, sodium hexasulfide, sodium heptasulfide, and sodium octasulfide.

In another embodiment of the methods of preparing the electroactive, energy-storing, highly crosslinked organic polymers of this invention, the methods comprise the steps of:

(a) providing a solution or suspension of an alkali metal polysulfide of formula $M_2S_m$ in a liquid medium, wherein M is an alkali metal selected from the group consisting of lithium, sodium, potassium, and cesium, and m is a integer from 3 to 10;

(b) adding to the solution or suspension of step (a), in the desired stoichiometric amount, a halogen substituted precursor comprising a carbocycle, wherein said halogens are selected from the group consisting of chlorine, bromine and iodine, and said carbocycle comprises from 3 to 12 ring carbon atoms;

(c) stirring and heating said mixture of step (b), thereby reacting said alkali metal polysulfide with said halogen substituted carbocyclic compound to form an electroactive, energy-storing, highly crosslinked organic polymer; and, (d) separating the polymer from the reaction medium.

In another embodiment, the mixture of step (c) is heated at a temperature between 20° C. and 100° C.

In another embodiment, the halogen substituted precursor comprises one or more unsaturated bonds. In a preferred embodiment, the halogen substituted precursor comprising a carbocycle is one or more materials selected from the group consisting of:

hexachlorocyclopentadiene, octachlorocyclopentadiene, 1,2,3,3,5,5-hexachloro-4-(dichloromethylene)-1-cyclopentene, 2,3,4,5,5-pentachloro-1-trichlorovinyl-1,3-cyclopentadiene and 1,2,3,4,5-pentachloro-5-(1,2,3,4,5-pentachlorocyclopenta-2,4-dienyl)cyclopenta-1,3-diene.

In one embodiment of the methods, the liquid medium comprises water. In a preferred embodiment, the liquid medium is water.

In another embodiment, the methods of preparing the polymers of this invention further comprise after step (d) one or more steps of:

(e) purifying the polymer after isolation; and, (f) drying the polymer.

Another aspect of the present invention pertains to composite cathodes comprising the electroactive, energy-storing, highly crosslinked organic polymers of this invention for use in electrochemical cells. In one embodiment, the cathode comprises:

(a) an electroactive, energy-storing, highly crosslinked organic polymer of the present invention, as described herein; and, (b) one or more conductive fillers selected from the group consisting of: conductive carbons, graphites, activated carbon fibers, non-activated carbon nanofibers, metal flakes, metal powders, metal fibers, carbon fabrics, metal mesh, electrically conductive polymers, and electrically conductive metal chalcogenides.

In a preferred embodiment, the composite cathode comprises:

(a) a polysulfide-containing polymer of the present invention derived from the condensation of hexachlorocyclopentadiene with sodium pentasulfide in water; and, (b) conductive carbons or non-activated carbon nanofibers.

In another embodiment, the composite cathode further comprises a binder. In another embodiment, the composite cathode further comprises a non-electroactive metal oxide. In one embodiment, the composite cathode further comprises an electrolyte. In one embodiment, the composite cathode further comprises a metal chalcogenide.

In one embodiment, the composite cathode comprises from 45 to 96 weight percent of the electroactive organic polymer of the present invention.

Another aspect of the present invention pertains to methods for preparing composite cathodes comprising the electroactive, energy-storing, highly crosslinked polymers of the present invention, which methods comprise the steps of:

(a) dispersing or suspending in a liquid medium an electroactive, energy-storing, highly crosslinked organic polymer of the present invention, as described herein;

(b) optionally adding to the mixture of step (a) a conductive filler;

(c) mixing the composition resulting from step (b) to disperse said electroactive polymer material, thereby forming a composition having a desired consistency and particle size distribution;

(d) casting the composition resulting from step (c) onto a suitable substrate or placing the composition resulting from step (c) into a mold; and, (e) removing some or all of the liquid from the composition resulting from step (d) to provide a solid or gel-like composite cathode structure in the shape or form desired.

In one embodiment, the methods further comprise subsequent to step (e), the step (f) of heating the composite cathode structure to a temperature of 120° C. or greater.

In one embodiment, the methods for preparing a composite cathode further comprise the addition to any or all of the steps (a), (b), or (c) of one or more materials selected from the group consisting of: binders, electrolytes, conductive fillers, non-electroactive metal oxides, and metal chalcogenides.

Another aspect of the present invention pertains to an electric current producing cell. The cell of this invention comprises an anode, a composite cathode comprising an electroactive, energy-storing, highly crosslinked polymer of the present invention as described herein, and an electrolyte interposed between said anode and said composite cathode. In one embodiment, the anode comprises one or more materials selected from the group consisting of: lithium metal, lithium-aluminum alloys, lithium-tin alloys, lithium-intercalated carbons and lithium-intercalated graphites. In one embodiment, the electrolyte is an organic electrolyte comprising one or more materials selected from the group consisting of: liquid electrolytes, gel polymer electrolytes, and solid electrolytes.

Another aspect of the present invention pertains to methods of forming an electric current producing cell. The methods comprise the steps of providing an anode, providing a cathode comprising an electroactive, energy-storing, highly crosslinked polymer of the present invention, as described therein, and interposing an electrolyte between said anode and said cathode.

DETAILED DESCRIPTION OF THE INVENTION

Cathode Polymers

Figure 1:
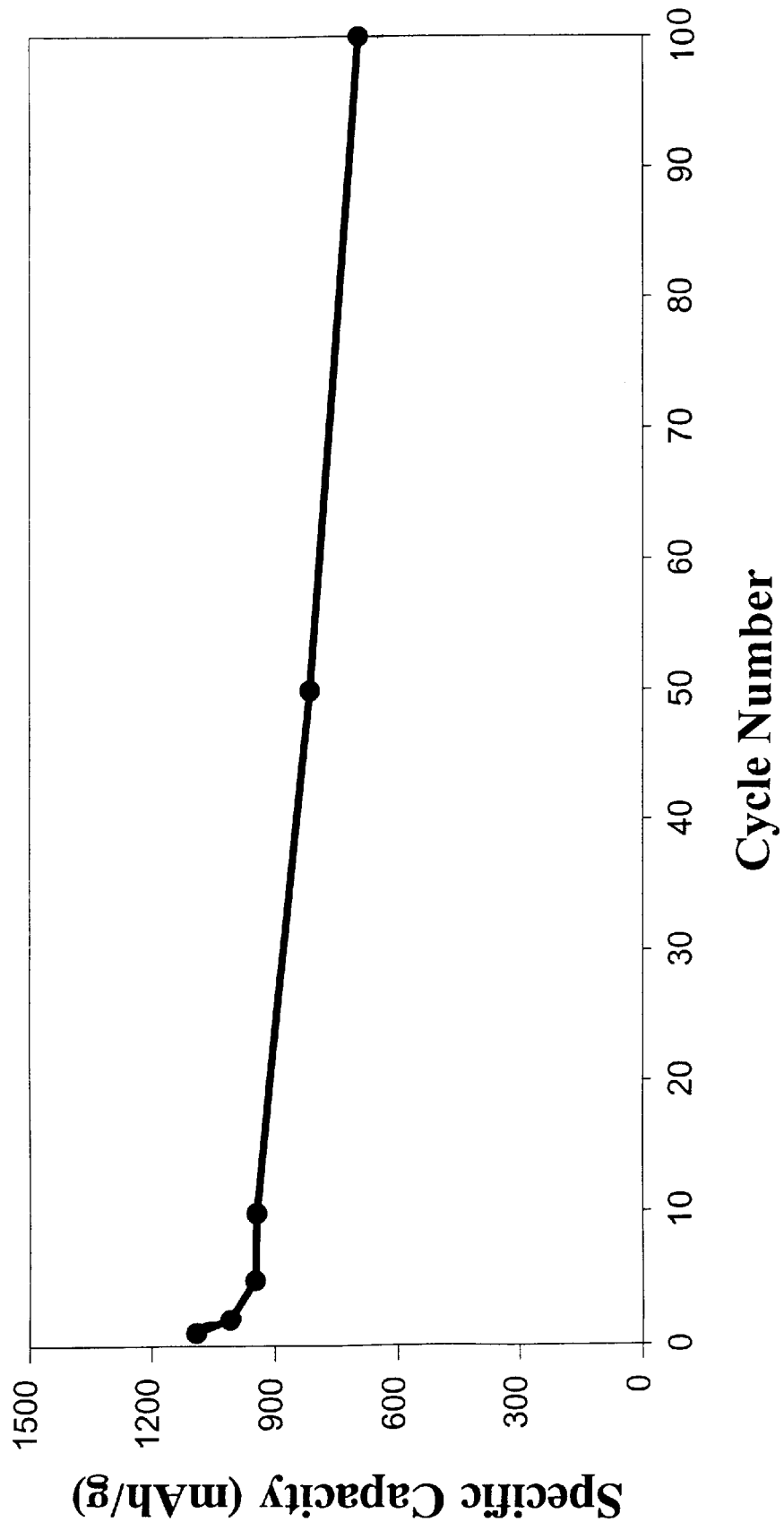
FIG. 1 shows a plot of cell specific capacity versus cycle number for a AA lithium battery cell comprising a cathode consisting of 70 wt % polysulfide polymer as described in Example 11.

One aspect of the present invention pertains to cathode polymers which are electroactive, energy-storing, highly crosslinked organic polymers and which comprise a plurality of carbocyclic repeat units which are covalently linked via polysulfide linkages.

The term "crosslinked polymer," and the synonyms "network polymer" and "reticulated polymer" are used herein in the conventional sense to refer to polymers in which polymer chains are linked together. Unlike linear or branched polymers, crosslinked polymers comprise at least one loop or circuitous chain. Highly crosslinked polymers are those which have a large number of loops or circuitous chains.

The term "carbocyclic repeat unit" or "carbocyclic compound," as used herein, refers to a polymer subunit or monomeric unit or to a compound which comprises a carbocycle having at least 3 ring carbon atoms, and which possess at least 3 covalent attachment points to adjacent repeat units. Typically, the carbocycle possesses from 3 to 12 ring carbon atoms. In one embodiment, the carbocycle possesses from 4 to 8 ring carbon atoms. In one embodiment, the carbocycle possesses from 5 to 6 ring carbon atoms. In one embodiment, the carbocycle possesses 5 ring carbon atoms. The carbocycle may comprise single, double, and/or triple bonds, and may be aromatic or non-aromatic.

Examples of carbocyclic repeat units which possess 5 ring carbon atoms include those derived from cyclopentanes, cyclopentenes, and cyclopentadienes. One preferred carbocyclic repeat unit which possess 5 ring carbon atoms is the cyclopentadien-hexa-yl moiety, shown below.

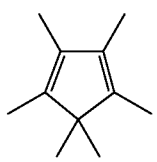

Another preferred carbocyclic repeat unit which possess 5 ring carbon atoms is the cyclopenten-octa-yl moiety, shown below.

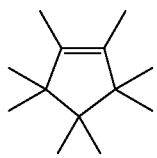

The term "polysulfide linkage," as used herein, relates to a divalent chemical moiety which links adjacent carbocyclic or other repeat units, and which, in its oxidized or partially oxidized state, comprises three or more sulfur (S) atoms linked in sequence. In this way, the polysulfide linkage comprises a divalent polysulfide moiety having the formula, —($S_m$)—, wherein m is an integer which is equal to or greater than 3. In one embodiment, the polysulfide linkage consists solely of a divalent chemical moiety having the formula, —($S_m$)—, wherein m is an integer which is equal to or greater than 3.

Typically, m is an integer from 3 to 10. In one embodiment, m is an integer from 3 to 8. In one embodiment, m is an integer from 3 to 6. In one embodiment, the polysulfide linkage comprises —S—S—S— (i.e., trisulfide). In one embodiment, the polysulfide linkage comprises —S—S—S—S— (i.e., tetrasulfide). In one embodiment, the polysulfide linkage comprises —S—S—S—S—S— (i.e., pentasulfide). In one embodiment, the polysulfide linkage comprises —S—S—S—S—S—S— (i.e., hexasulfide). In one embodiment, the polysulfide linkage comprises —S—S—S—S—S—S—S— (i.e., heptasulfide). In one embodiment, the polysulfide linkage comprises —S—S—S—S—S—S—S—S— (i.e., octasulfide).

The term "disulfide," as used herein, relates to a divalent chemical moiety, which, in its oxidized or partially oxidized state, comprises only two sulfur (S) atoms linked in sequence. In this way, a disulfide moiety has the formula —S—S—.

One class of electroactive, energy-storing, highly crosslinked organic polymers of the present invention may conveniently be described by the following formula I,

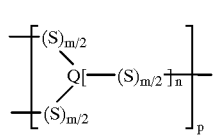

I wherein Q denotes a carbocyclic repeat unit comprising a carbocycle having from 3 to 12 ring carbon atoms; S denotes a sulfur atom; m denotes the number of sulfur atoms in a given polysulfide linkage, is the same or different at each occurrence, and is an integer greater than or equal to 3, typically from 3 to 10; n denotes the number of branching or crosslinking polysulfide linkages, is the same or different at each occurrence, and is an integer greater than or equal to 1, typically from 1 to 20; and p denotes the number of adjacent carbocyclic repeat units and is an integer greater than 1.

In one embodiment, the carbocycle has from 3 to 12 ring carbon atoms. In another embodiment, the carbocycle has from 4 to 8 ring carbon atoms. In one preferred embodiment, the carbocycle has from 5 to 6 ring carbon atoms. In one preferred embodiment, the carbocycle has 5 ring carbon atoms.

In one embodiment, Q is a carbocycle with from 3 to 12 ring carbon atoms. In another embodiment, Q is a carbocycle with from 4 to 8 ring carbon atoms. In one preferred embodiment, Q is a carbocycle with from 5 to 6 ring carbon atoms. In one preferred embodiment, Q is a carbocycle with 5 ring carbon atoms.

In one embodiment, Q comprises two carbocycles, each having from 3 to 12 ring carbon atoms, which rings are linked by one carbon-carbon bond. In one embodiment, Q comprises two carbocycles, each having from 3 to 12 ring carbon atoms, which rings are linked by two carbon-carbon bonds. In one preferred embodiment, Q has two carbocycle rings, each with 5 ring carbon atoms linked by one carbon-carbon bond. In one preferred embodiment, Q has two carbocycle rings, each having 5 ring carbon atoms linked by two carbon-carbon bonds.

In one preferred embodiment, n is an integer from 1 to 20. In one preferred embodiment, n is an integer from 2 to 8. In one preferred embodiment, n is an integer from 4 to 6. In one preferred embodiment, n is 4. In one preferred embodiment, n is 5. In one preferred embodiment, n is 6.

In one preferred embodiment, m is an integer from 3 to 8. In one preferred embodiment, m is an integer from 3 to 6.

In one embodimnet, the electroactive, energy-storing, highly crosslinked organic polymers of the present invention comprise at least about 78% by weight sulfur. In one preferred embodiment, they comprise at least about 85% by weight sulfur. In one preferred embodiment, the electroactive, energy-storing, highly crosslinked organic polymers of the present invention comprise at least about 88% by weight sulfur.

In one embodiment, the electroactive, energy-storing, highly crosslinked organic polymers of the present invention are prepared by the condensation of hexachlorocyclopentadiene with sodium polysulfides (e.g., $Na_2S_m$). It is believed that such condensation reactions yield highly crosslinked polymers comprising one or more segments of the following formulae II, III, and IV, wherein the average value of m is determined by the nature of the sodium polysulfide employed. For example, the average value of m is approximately 4 when sodium tetrasulfide is used, and is approximately 5 when sodium pentasulfide is used.

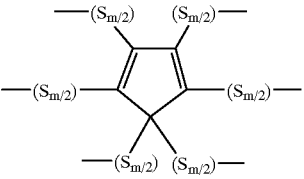

II

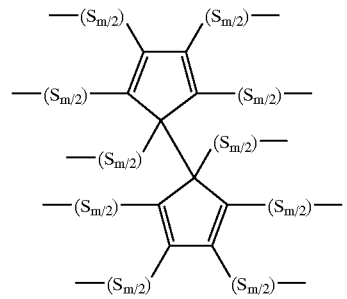

III

-continued

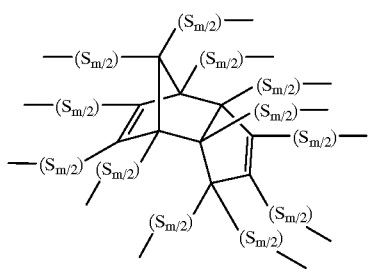

IV

Table 1 lists the theoretical elemental compositions and theoretically expected storage capacities for electroactive, energy-storing, highly crosslinked organic polymers of the present invention that are comprised primarily of segments of formula II.

TABLE 1

Theoretical elemental compositions and storage capacities for polymers comprising repeat units of formula II as a function of m, the size of the polysulfide, -($S_m$)-, linking units.

| m | Empirical Formula | Wt % S | Equivalent Wt. (g/No. of electrochemically available electrons) | Specific Capacity (mAh/g) |
|---|---|---|---|---|
| 2 | ($C_5S_6$) | 76.2% | 42 | 638 |
| 3 | ($C_5S_9$) | 82.7% | 29 | 924 |
| 4 | ($C_5S_{12}$) | 86.5% | 24.7 | 1085 |
| 5 | ($C_5S_{15}$) | 88.9% | 22.5 | 1191 |
| 6 | ($C_5S_{18}$) | 90.5% | 21.2 | 1264 |
| 7 | ($C_5S_{21}$) | 91.8% | 20.3 | 1318 |
| 8 | ($C_5S_{24}$) | 92.7% | 19.7 | 1360 |

An especially preferred electroactive, energy-storing, highly crosslinked organic polymer of the present invention is one prepared from the condensation of hexachlorocyclopentadiene with sodium pentasulfide. This polymer exhibited a sulfur content of 89% by weight and an initial specific capacity on electrochemical reduction of 1190 mAh/g. These values are almost identical to those predicted in Table 1 where m is 5 and the empirical formula is $C_5S_{15}$.

Another especially preferred electroactive, energy-storing, highly crosslinked polymer of the present invention is one prepared from the condensation of 1,2,3,4,5-pentachloro-5-(1,2,3,4,5-pentachlorocyclopenta-2,4-dienyl)cyclopenta-1 3-diene with sodium polysulfide. This polymer is believed to be comprised primarily of segments of Formula III.

A unique feature of the electroactive, energy-storing, highly crosslinked organic polymers of the present invention, as described herein, is the highly crosslinked three-dimensional open network structure and the associated high void volume. Without wishing to be bound by any particular theory, it is believed that this highly open framework structure significantly contributes to the facile diffusion of ions and electrolyte into the networked structure, resulting in a high electrochemical utilization of the available electroactive sulfur-sulfur linkages and an observed high sustained electrochemical capacity on cycling, as shown in FIG. 1.

In one embodiment, the highly crosslinked organic polymer of the present invention is a copolymer, wherein the copolymer comprises two or more different carbocyclic repeat units (Q) which are covalently linked via polysulfide linkages comprising divalent polysulfide moieties (which, in their oxidized or partially oxidized state, comprises three or more sulfur (S) atoms linked in sequence).

An especially preferred electroactive, energy-storing, highly crosslinked organic copolymer of the present invention is one prepared from the condensation of hexachlorocyclopentadiene and 1,2,3,4,5-pentachloro-5-(1,2,3,4,5-pentachlorocyclopenta-2,4-dienyl)cyclopenta-1,3-diene with sodium polysulfide.

In another embodiment, the highly crosslinked organic polymer of the present invention is a copolymer, wherein the copolymer comprises one or more carbocyclic repeat units and one or more non-carbocyclic repeat units, wherein the repeat units are covalently linked via polysulfide linkages comprising a divalent polysulfide moiety (which, in its oxidized or partially oxidized state, comprises three or more sulfur (S) atoms linked in sequence). The term "non-carbocyclic repeat unit", as used herein, relates to polymer subunits or monomeric units which do not comprise a carbocycle. In one embodiment the non-cyclic repeat units comprise alkyl or alkenyl units. Examples of non-carbocyclic repeat units include, but are not limited to, methyl, ethyl, 1,3-di-substituted propyl, 1,2,3-tri-substituted propyl, 1,4-di-substitiuted-n-butyl, 1,4-di-substituted-2-buttenyl, and the like.

An especially preferred electroactive, energy-storing, highly crosslinked organic copolymer of the present invention is one prepared from the condensation of hexachlorocyclopentadiene and 1,2,3-trichloropropane with sodium polysul fide.

By including such non-carbocyclic repeat units, the void volume of the resulting polymer can be modulated. These non-carbocyclic repeat units may provide some segmental motion in the linkage regions of the copolymer, thereby further facilitating ion insertion and electrolyte impregnation.

Methods For Making Polymers Of Present Invention

Another aspect of the present invention pertains to processes for making the highly crosslinked polysulfur containing cathode polymers of this invention. Methods for making molecular species containing polysulfide moieties are well known in the art. Methods have also been disclosed for making linear polymers comprising polysulfide linkages in the polymer backbone as, for example, those described in U.S. Pat. No. 2,466,963 to Patrick et al.; U.S. Pat. Nos. 5,155,275, 5,530,163 to Shaw; U.S. Pat. No. 5,464,931 to Shaw et al.; and U. S. Pat. No. 5,565,517 to Efner et al.

Known procedures for preparing polysulfide compounds generally involve the condensation of dithiols with elemental sulfur in the presence of a catalyst in an organic solvent medium, or the condensation of a dihalide with sodium polysulfidcs in an organic solvent. The materials thus obtained have morphologies of usual polymer compositions being generally particulate in nature, substantially non-porous, and of low surface area.

It has now been discovered quite surprisingly that when an organic halide moiety, such as hexachlorocyclopentadiene, is condensed with sodium polysulfides in an aqueous solution, the morphology of the resulting product is substantially different from that obtained by conducting the same condensation reaction in an organic solvent such as dimethyl sulfoxide, dimethylformamide, N-methylpyrrolidone, and the like. The morphology of the particulate product obtained from the condensation comprising aqueous media is one that shows a very open structure with many interconnecting microvoids, thus providing a product with a very high surface area, typically greater than about 10 $m^2$/g. The morphology of a typical polymer product prepared by the process of the present invention in aqueous media is shown in the SEM micrograph in FIG. 2.

In one embodiment of the methods of preparing the electroactive, energy-storing, highly crosslinked organic polymers of the present invention, the methods comprise the steps of:

(a) providing a solution or suspension of an alkali metal polysulfide of formula $M_2S_m$ in a liquid medium, wherein M denotes an alkali metal selected from the group consisting of lithium, sodium, potassium, and cesium, and m is an integer from 3 to 10;

(b) adding to the solution or suspension of step (a), in the desired stoichiometric amount, a halogen substituted carbocyclic compound, as described herein, wherein said halogen is selected from the group consisting of chlorine, bromine, and iodine, and said carbocyclic compound comprises from 3 to 12 ring carbon atoms; and, (c) stirring and heating the mixture of step (b), thereby reacting said alkali metal polysulfide with said halogen substituted carbocyclic compound to form said highly crosslinked organic polymer.

In one embodiment, the method further comprises the subsequent step of separating the highly crosslinked organic polymer from the reaction medium.

Another embodiment of the present invention pertains to the process described above wherein said process further comprises the steps of purifying the polysulfide polymer separated from the reaction medium by repeated washing with aqueous and optionally nonaqueous solvents. Yet another embodiment of the present invention pertains to the process which further comprises drying of the purified polysulfide polymer. Methods for drying said polymer can vary widely and include, but are not limited to, drying under vacuum, air drying, heat drying, solvent drying, freeze drying, and the like.

Suitable halogen polysubstituted carbocyclic compounds include those comprising a carbocycle having at least 3 ring carbon atoms, typically from 3 to 12 ring carbon atoms, and which possess at least 3 substituent halogen atoms, typically from 3 to 14 substituent halogen atoms. The carbocycle may comprise single, double, and/or triple bonds, and may be aromatic or non-aromatic. Examples of halogen polysubstituted carbocyclic compounds which are suitable for use in the methods of the present invention include, but are not limited to: hexachlorocyclopentadiene (V); octachlorocyclopentene (VI); 1,2,3,3,5,5-hexachloro-4-(dichloromethylene)-1-cyclopentene (VII); 2,3,4,5,5-pentachloro- 1-trichlorovinyl-1,3-cyclopentadiene (VIII); and, 1,2,3,4,5-pentachloro-5-(1,2,3,4,5-pentachloropenta-2,4-dienyl)cyclopenta-1,3-diene (IX); all shown below.

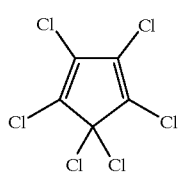

V

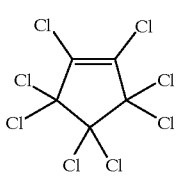

VI

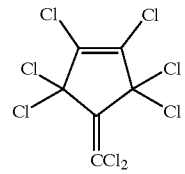

VII

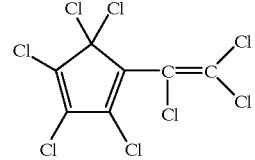

VIII

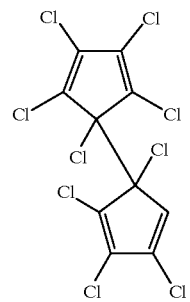

IX

Liquid media suitable for use in the process of the present invention include aqueous and nonaqueous liquids. Examples of useful nonaqueous liquids include but are not limited to, one or more liquids selected from the group consisting of: methanol, ethanol, isopropanol, propanol, butanol, tetrahydrofuran, dimethoxyethane, toluene, acetonitrile, dimethylformamide, dimethylsulfoxide, dimethylacetamide, hexamethylphosphoramide, and N-methylpyrrolidone. Liquid media preferred in the practice of this invention are those comprising water. The liquid medium especially preferred in the practice of this invention is water.

The temperature at which the process is carried out for making the polysulfide polymer of the present invention ranges from between about 20 to 100° C. Preferred temperatures are those between 50 and 100° C., and especially preferred are those above about 90° C.

The method for separating the polymer from the reaction media is not critical, and may vary widely. Useful methods include filtration, gravity sedimentation, centrifugation, and the like.

In another embodiment of the methods of preparing the electroactive, energy-storing, highly crosslinked organic polymers of the present invention, the polymer may be prepared in the presence of a conductive carbon, for example non-activated carbon nanofibers or activated carbon fibers, or in the presence of a metal oxide, for example a vanadium oxide aerogel, to form a polymer composite. In one embodiment, the methods comprise the steps of:

(a) providing a solution or suspension of an alkali metal polysulfide of formula $M_2S_m$ in a liquid medium, wherein M denotes an alkali metal selected from the group consisting of: lithium, sodium, potassium, and cesium, and m is an integer from 3 to 10;

(b) adding to the solution or suspension of step (a), in the desired stoichiometric amount, a halogen substituted carbocyclic compound, wherein said halogen is selected from the group consisting of chlorine, bromine, and iodine, and said carbocyclic compound comprises from 3 to 12 ring carbon atoms;

(c) adding to the solution or suspension of step (a), in the desired amount, a conductive carbon, a non-activated carbon nanofiber or a metal oxide; and, (d) stirring and heating the mixture of step (b), thereby reacting said alkali metal polysulfide with said halogen substituted carbocyclic compound to form said highly crosslinked organic polymer composite material.

In one embodiment, the method further comprises the subsequent step of separating the electroactive, energy-storing, highly crosslinked organic polymer composite material from the reaction medium.

One advantage of the methods of preparing the electroactive, highly crosslinked organic polymers of the present invention is that the methods result in a single reaction step synthesis with high yield, that may be performed in aqueous media, and that is particularly suitable for a highly efficient scale-up to large quantities.

Cathodes Comprising Polysulfide Polymers Of Present Invention

One embodiment of the present invention pertains to a composite cathode for use in an electrochemical cell, said cathode comprising:

(a) an electroactive, energy storing, highly crosslinked polysulfide-containing polymer cathode material, wherein said polymer cathode material comprises a carbocyclic repeat unit comprising a carbocycle having at least 3 carbon atoms in the ring, wherein said carbocyclic ring structure supports 3 or more covalent linkages to neighboring repeat units in the polymer, and said linkages are comprised of polysulfide linkages comprising a divalent polysulfide moiety having the formula, —$(S_m)$—, wherein m is the same or different at each occurrence and is an integer from 3 to 10; and, (b) one or more conductive fillers selected from the group consisting of: conductive carbons, graphites, activated carbon fibers, metal flakes, metal powders, metal fibers carbon fabrics, metal mesh, electrically conductive polymers, and electrically conductive metal chalcogenides.

Further useful conductive additives in the composite cathode of the present invention are non-activated carbon nanofibers, as described in present applicant's copending U.S. patent application Ser. No. 08/994,708 titled "Electrochemical Cells with Carbon Nanofibers and Electroactive Sulfur Compounds", filed on even date herewith.

Optionally, the composite cathode of the present invention may further comprise binders, electrolytes and other additives to further improve the electrochemical recycleability and capacity of the cells.

In one embodiment of the present invention the above composite cathode further comprises a binder. The choice of binder material may vary widely so long as it is inert with respect to the composite cathode materials. Useful binders are those materials, usually polymeric, that allow for ease of processing of battery electrode composites and are generally known to those skilled in the art of electrode fabrication. Examples of useful binders include, but are not limited to, those selected from the group consisting of: polytetrafluoroethylenes (Teflon®), polyvinylidine fluorides ($PVF_2$ or PVDF), ethylene-propylene-diene (EPDM) rubbers, polyethylene oxides (PEO), lV curable acrylates, UV curable methacrylates, and heat curable divinylethers, and the like.

Other useful binders for use in the present invention are cationic polymers with quaternary ammonium salt groups, as described in applicant's copending U.S. patent application Ser. No. 08/994,708 titled "Electrochemical Cells with Cationic Polymers and Electroactive Sulfur Compounds", filed on even date herewith.

Yet another embodiment of the present invention pertains to the above composite cathodes which further comprise a non-electroactive metal oxide. Such compositions may be added to improve the fabrication as well as the electrochemical properties of the resulting cathode. Examples of such non-electroactive metal oxides include, but are not limited to, those selected from the group consisting of: silicas, aluminas, and silicates.

Other useful non-electroactive metal oxides for use in the present invention are described in applicant's co-pending U.S. patent application Ser. No. 08/994,708 titled "Cathodes Comprising Electroactive Sulfur Materials and Secondary Batteries Using Same", filed on even date herewith. Such metal oxides show a strong adsorption of inorganic polysulfides, such as lithium octasulfide.

Other useful additives for use in composite cathode of the present invention include, but are not limited to, electroactive metal chalcogenides as described in copending U.S. patent application Ser. No. 08/859,996, now U.S. Pat. No. 5,919,585, to common assignee.

Another embodiment of the present invention pertains to any of the above described cathode compositions which further comprise an electrolyte. Examples of useful electrolytes include, any liquid, gel, solid, or solid-like materials capable of storing and transporting ions, so long as the electrolyte material is chemically inert with respect to the cathode material and the electrolyte material facilitates the transportation of ions. Examples of suitable electrolytes are described below.

Still another embodiment of the present invention pertains to any of the above-described cathode compositions which further comprise a current collector. Examples of useful current collectors include, but are not limited to, those selected from the group consisting of: metallized plastic films, metal foils, metal grids, expanded metal grids, metal mesh, metal wool, woven carbon fabric, woven carbon mesh, non-woven carbon mesh, and carbon felt.

The relative amounts of the polysulfur-containing polymer of the present invention, conductive filler, non-electroactive metal oxide, binder, electrolyte and current collector in the composite cathode of this invention can vary widely. Generally these relative amounts are determined by usual experimentation and chosen so as to optimize the amount of the polysulfur containing polymer component, the energy storage capacity of the cathode, and the electrochemical performance of the composite cathode in an electrolytic cell. Typically, the amount of electroactive polysulfide-containing polymer used in the composite cathode will vary from about 45 wt % to 96 wt %. Preferred are composite cathodes comprising between 60 wt % and 96 wt % electroactive polysulfide-containing polymer. Especially preferred are those containing greater than about 80 wt % electroactive polysulfide-containing polymer.

The amount of conductive filler used in the composite cathodes of the present invention can also vary greatly and will typically be less than 15 wt % of the composite cathode. In those cases where binder and conductive filler are desired, the amounts of binder and conductive filler can vary widely and the amounts present will depend on the desired performance. Typically, when binders and conductive fillers are used, the amount of binder will vary greatly, but will generally be less than about 15 wt % of the composite cathode. Preferred amounts are less than about 10 wt %. Preferred amounts of non-electroactive metal oxide additives are generally less than about 12 wt %.

The amount of electrolyte used in the composite cathodes of the present invention can vary widely. When used, amounts of electrolyte present in the cathode will generally be less than about 15 wt %.

Particularly preferred composite cathodes are those comprised of a polysulfide-containing polymer derived from the condensation of hexachlorocyclopentadiene with sodium pentasulfide in water, conductive carbon powders and non-activated carbon nanofibers.

Methods Of Making Cathodes Comprising Polymers Of Present Invention

One aspect of the present invention pertains to methods for fabricating composite cathodes comprising the electroactive, highly crosslinked organic polymers of the present invention.

In one embodiment, the methods relate to the fabrication of composite cathodes by the physical mixture of the electroactive, highly crosslinked organic polymers of the present invention, the conductive filler, and optionally binders, electrolytes, and non-electroactive metal oxides either as dry solids, or as a slurry, in a solvent or mixtures of solvents. The resulting mixture is then fabricated into a cathode structure of desired dimensions, for example, by casting, coating, dip-coating, extrusion, calendering, and other means known in the art.

In one embodiment of the methods of fabricating the composite cathodes of the present invention, the methods comprise the steps of:
 (a) dispersing or suspending an electroactive, highly crosslinked polysulfide-containing polymer material, as described herein, in a liquid medium;
 (b) adding to the composition resulting from step (a) a conductive filler:
 (c) mixing the composition resulting from step (b) to disperse said electroactive polysulfide-containing polymer material, thereby forming a composition having a desired consistency and particle size distribution;
 (d) casting or extruding the composition resulting from step (c) onto a suitable substrate or placing the composition resulting from step (c) into a mold; and,
 (e) removing some or all of the liquid medium from the composition resulting from step (d) to provide a solid or gel-like composite cathode structure in the shape or form desired.

In one embodiment, the method further comprises the subsequent step of heating the composite cathode structure of step (e) to a temperature of 120° C. or greater.

Liquid media suitable for use in the methods of the present invention include aqueous liquids, nonaqueous liquids, and mixtures thereof. Examples of liquid media include, but are not limited to, those selected from the group consisting of: water, methanol, ethanol, isopropanol, propanol, butanol, tetrahydroffuran, dimethoxyethane, acetone, toluene, xylene, acetonitrile, heptane, and cyclohexane. Most preferred liquids are those selected from the group consisting of acetone, isopropanol, and mixtures of water and an alcohol.

In another embodiment of the methods of preparing the composite cathodes of the present invention, the methods comprise the steps of:
 (a) coating a current collector substrate with a cathode composition comprising the electroactive, highly crosslinked organic polymer of the present invention; and,
 (b) drying or curing said composition to form a solid or gel-type electroactive cathode layer on said current collector substrate.

Optionally, binders, electrolytes, conductive fillers and other additives may be added to the compositions at one or more of the various steps in the methods described above, usually at steps which involve dissolving, dispersing, or mixing. Such additives often facilitate or improve adhesion, cohesion, current collection, and ion transport.

The temperature at which various components in the above processes are suspended or dispersed is not critical and any temperature can be used so long as the desired suspension or dispersion of the components in the liquid medium is obtained. For the fabrication of some composite cathodes, it may be desirable to use higher temperatures so as to cause the dissolution of one or more components during the process. A lower temperature may also be desired so as to effectively cause one or more components to separate out in a gel or precipitated form. Useful temperatures can be routinely determined experimentally by one skilled in the art. Preferred temperatures are those at which a binder, solid electrolyte, or non-electroactive metal oxide initially dissolves or forms a colloidal solution in the liquid medium. Especially preferred temperatures are those which further provide for an economical process. Most preferred temperatures are those which are close to room temperature or slightly above.

Mixing of the various compositions in the methods described above can be accomplished by a variety of methods so long as the desired dissolution and dispersion of the materials is obtained. Suitable methods of mixing include mechanical agitation, grinding, ultrasonication, ball-milling, sand milling, impingement milling, and the like.

Removal of some or all of the liquid from the various compositions in the methods described above can be accomplished by a variety of conventional means, so long as the resulting product has the desired porosity and pore size distribution, surface area, shape, chemical composition, adhesion to the current collector or other substrate, and the like. Useful methods for removal of liquid employ forced hot air convection, heat, infrared radiation, flowing gases, vacuum, reduced pressure, extraction, and the like. Preferred methods for removal of liquid include forced hot air convection, vacuum evaporation, reduced pressure, infrared heating, and flowing gas. Most preferred methods involve a combination of these preferred techniques.

It is well known in the art of battery electrode fabrication that, by casting a slurry of electrode components and removing the solvent, thin films and coatings with the desired thickness can be made. One of skill in the art will appreciate that, by flash evaporation of the solvent from a slurry of the electroactive sulfur-containing cathode material, one can produce finely divided powders with varying particle sizes. Powdered composite cathode materials prepared by the processes of the present invention can be hot or cold pressed, slurry coated or extruded onto current collecting materials by techniques known to those skilled in the art of battery electrode fabrication.

Examples of preferred composite cathodes prepared using the processes of the present invention include, but are not limited to, thin film structures up to about 25 $\mu$m in thickness, coatings on current collectors from 5 microns up to about 100 $\mu$m in thickness, and powdered composite structures.

Rechargeable Battery Cells and Methods of Making Same

One aspect of the present invention pertains to a rechargeable, electric current producing cell which comprises:
 (a) an anode;
 (b) a composite cathode, comprising a highly crosslinked polymer of the present invention; and, (c) an electrolyte that is interposed between the anode and the cathode and that is stable in the presence of the anode and cathode.

Another aspect of the present invention pertains to methods of forming rechargeable, electric current producing cells, said methods comprising the steps of:

(a) providing an anode;

(b) providing a composite cathode of the present invention; and, (c) interposing an electrolyte between said anode and said composite cathode.

Suitable anode active materials for the electrochemical cells of the present invention include, but are not limited to, one or more metals or metal alloys or a mixture of one or more metals and one or more alloys, wherein said metals are selected from the Group IA and IIA metals in the Periodic Table. Examples of useful anode materials of the present invention include, but are not limited to, alkali-metal intercalated conductive polymers, such as lithium doped polyacetylenes, polyphenylenes, polypyrroles, and the like, and alkali-metal intercalated graphites and carbons. Anode materials comprising lithium are especially useful. Preferred anode materials are lithium metal. lithium-aluminum alloys, lithium-tin alloys, lithium-intercalated carbons, and lithium-intercalated graphites.

The electrolytes used in battery cells function as a medium for storage and transport of ions, and in the special case of solid electrolytes, these materials may additionally function as separator materials between the anode and the cathode. Any liquid, solid, or solid-like material capable of storing and transporting ions may be used, so long as the material is sufficiently chemically and electrochemically inert with respect to the anode and the cathode and the material facilitates the transportation of ions between the anode and the cathode without providing electrical conductivity that might cause a short circuit between the anode and the cathode.

Examples of suitable electrolytes for use in the present invention include, but are not limited to, organic electrolytes comprising one or more materials selected from the group consisting of: liquid electrolytes, gel polymer electrolytes, and solid polymer electrolytes.

Examples of useful liquid electrolyte solvents include, but are not limited to, N-methyl acetamide, acetonitrile, carbonates, sulfones, sulfolanes, glymes, siloxanes, dioxolanes, N-alkyl pyrrolidones, substituted forms of the foregoing, and blends thereof.

These liquid electrolyte solvents are themselves useful as gel forming (plasticizing) agents for gel-polymer electrolytes. Further examples of useful gel-polymer electrolytes include, but are not limited to, those comprising polymers selected from the group consisting of: polyethylene oxides (PEO), polypropylene oxides, polyacrylonitriles (PAN), polysiloxanes, polyimides, polyethers, sulfonated polyimides, perfluorinated membranes (NAFION® resins), divinyl polyethylene glycols, polyethylene glycol-bis-(methyl acrylates), polyethylene glycol-bis-(methyl methacrylates), derivatives of the foregoing, copolymers of the foregoing, crosslinked and network structures of the foregoing, and blends of the foregoing; to which is added an appropriate ionic electrolyte salt.

Examples of useful solid polymer electrolytes include, but are not limited to, those comprising polymers selected from the group consisting of: polyethers, polyethylene oxides (PEO), polypropylene oxides, polyimides, polyphosphazenes, polyacrylonitriles (PAN), polysiloxanes, polyether grafted polysiloxanes, derivatives of the foregoing, copolymers of the foregoing, crosslinked and network structures of the foregoing, and blends of the foregoing; to which is added an appropriate ionic electrolyte salt. Tonically conductive solid polymer electrolytes may additionally function as separator materials between the anode and the cathode.

In addition to solvents, gelling agents and ionically conductive polymers as known in the art for organic electrolytes, the organic electrolyte further comprises one or more ionic electrolyte salts, also as known in the art, to increase the ionic conductivity.

Examples of ionic electrolyte salts for use in the present invention include, but are not limited to, $MCIO_4$, $MAsF_6$, $MSO_3CF_3$, $MSO_3CH_3$, $MBF_4$, $MB(Ph)_4$, $MPF_6$,

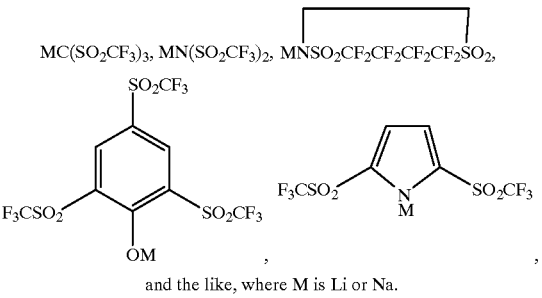

and the like, where M is Li or Na.

Other electrolyte salts useful in the practice of this invention are disclosed in U.S. Pat. No. 5,538,812 to Lee et al. Preferred ionic electrolyte salts are $LiSO_3CF_3$ (lithium triflate) and $LiN(SO_2CF_3)_2$ (lithium imide).

EXAMPLES

Several embodiments of the present invention are described in the following examples, which are offered by way of illustration and not by way of limitation.

All synthesis steps described in Examples 1 to 8, prior to filtration of the product were performed under argon.

Example 1

A polysulfide-containing polymer was prepared in an organic solvent according to the following procedure. Sulfur (82.52 g), $Na_2S$ (50.22 g) and 450 mL of dry N,N-dimethylformamide (distilled from $CaI_2$) was stirred for 1 hour at room temperature and then for 12 hours at 62° C. To this 34.38 my of hexachlorocyclopentadiene (58.51 g, Velsicol Chemical Corporation, Rosemont, Ill.) was added over 35 minutes at 70–85° C. The reaction mixture was then stirred at 85° C. for 9 hours. Gelation began after 1 hour with the reaction mixture forming a very thick gel by the end of 9 hours. 1 he mixture was diluted with 500 ml. of acetone, filtered and washed with water and then with acetone; all filtrates were colorless. The isolated polymer was dried on the filter for 30 minutes in air, then under vacuum for 6 hours at 110° C. The yield was 107.1 g (92.3%), with an elemental composition comprising 89.08% S; 11.42% C; and 0.20% Cl. No peaks or transitions were observed via differential scanning calorimetry up to 250° C.

Example 2

A polysulfide-containing polymer was prepared in water according to the following procedure. Sulfur (384.72 g) was added to the solution of $Na_2S \cdot nH_2O$ (flakes, 60–62% $Na_2S$, 383.9 g) in 3350 mL of $H_2O$. The reaction mixture was stirred at ambient temperature for 2 hours and then at 95° C.

for approximately 5 hours until all the sulfur dissolved. Hexachlorocyclopentadiene (272.77 g) was slowly added at a mix temperature of 95–97° C. over a period of 1 hour. The reaction mixture was then stirred for 8 hours at 95° C. After cooling to room temperature, the reaction was filtered and washed with water until the conductivity of the final filtrate was 80–120 kΩm, and then washed with acetone; all filtrates were colorless. The resulting polymer was dried in vacuum for 6 hours at 100° C. The yield was 540 g, approximately 100%. Elemental analysis gave a composition of 93.74% S, 6.25% C, 0.3% Cl, and 0.23% H. Thermal gravimetric analysis showed that weight loss starts at 220–250° C. (scan rate 10° C./minute). The surface area (standard BET method) of the polymer was 132 $m^2/g$.

Figure 2:
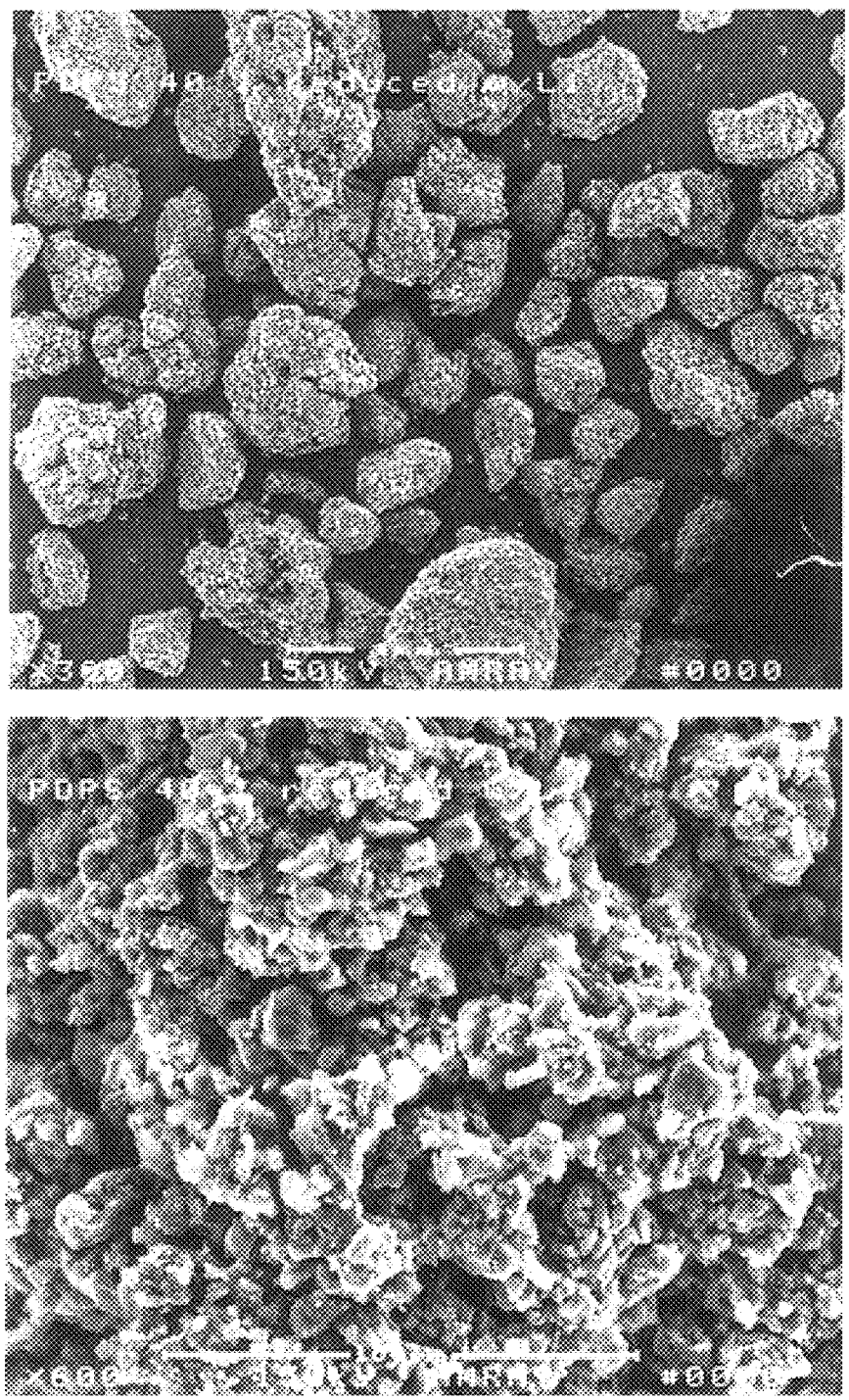
FIG. 2 shows a scanning electron (SEM) micrograph depicting the open morphology and high surface area particles of a polysulfide polymer prepared by a process of the present invention.
Figure 3:
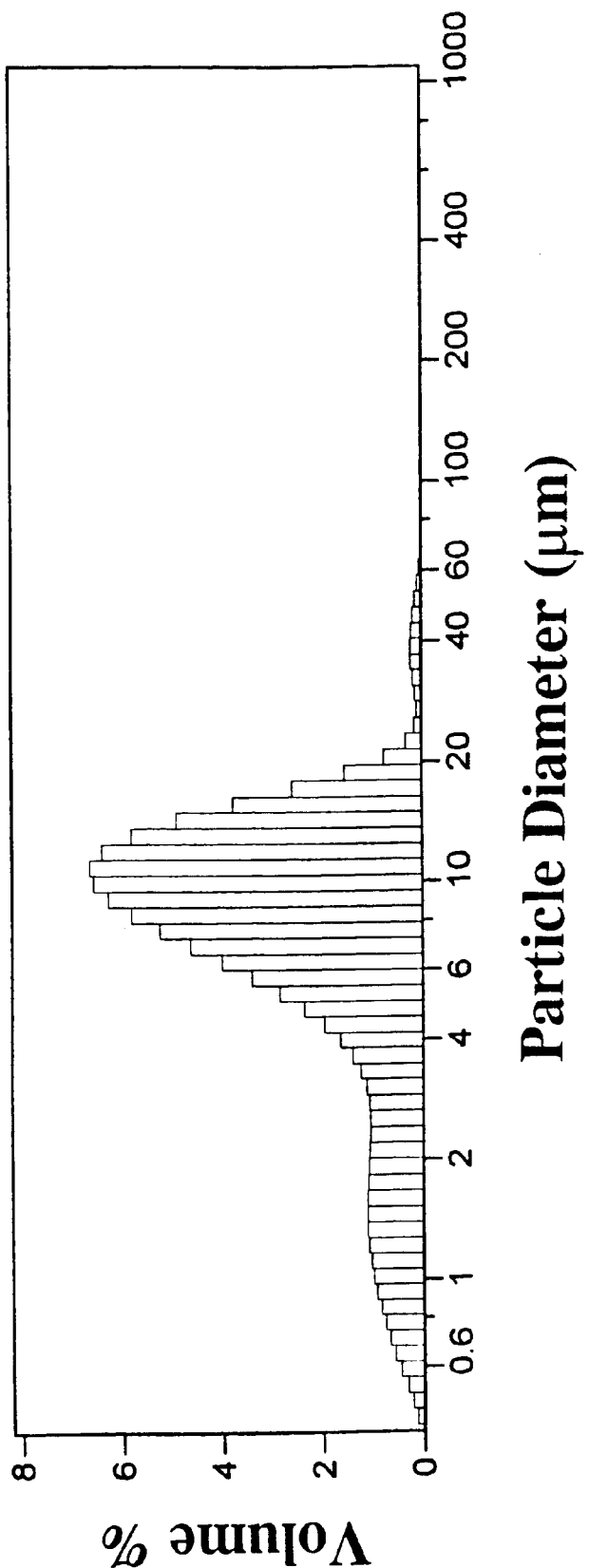
FIG. 3 shows the particle size distribution for as synthesized, high surface area polysulfide polymer prepared by a process of the present invention described in Example 2.

The morphology of this polymer product made in aqueous media is shown in the SEM micrograph in FIG. 2. The particle size distribution of this polysulfide polymer prior to purification and drying is shown in FIG. 3, illustrating that the polymer as synthesized has a particle size distribution (typical mean particle size <10 Kim) suitable for use in the fabrication of composite cathodes.

Example 3

A polysulfide-containing polymer was prepared from 1,2, 3,4,5-pentachloro-5-(1,2,3,4,5-pentachlorocylcopenta-2,4-dienyl)cylcopenta-1,3-diene according to the following procedure. To a suspension of anhydrous sodium sulfide (1.56 g) in 50 mL of anhydrous dimethylformamide was added 0.64 g of sulfur. The solution was stirred for 24 hours at 80° C. until all solids were dissolved. To this solution 5 mL of 1,2,3,4,5-pentachloro-5-(1,2,3,4,5-pentachlorocylcopenta-2,4-dienyl)cylcopenta-1,3-diene (2.34 g) in tetrahydrofuran was added over 30 minutes at 75° C. The reaction mixture was stirred for 14 hours at 85° C., and then was diluted with 200 mL of water and filtered. The product was washed subsequently with water, acetone, $CS_2$ and acetone, and dried in vacuum at 70° C. The yield was 1.3 g (60%), with an elemental composition of 37.23% C, 50.46% S and 0.015% Cl.

Example 4

A polysulfide-containing polymer/carbon composite was prepared according to the following procedure. $Na_2S$—$xH_2O$ (90.20 g) was dissolved in 700 mL of water. To this solution was added 89.77 g of pure sulfur (2.8 mol). The mixture was stirred at room temperature, and then at 50° C. until all the sulfur dissolved. To this solution was then added a mixture of hexachlorocyclopentadiene (68.16 g) and activated carbon fibers (25.5 g, carbonized hydrated cellulose as described in Chemical Abstracts, Columbus, Ohio, Abstract Nos. 110:117317q and 110:12905k) with rapid stirring. The suspension was then stirred at 57° C. and the temperature was gradually increased to 95° C. over one hour, then held at 95° C. for 16 hours. The suspension was then filtered, washed with water, and subsequently washed with acetone. The product was air dried overnight at 60° C. to give 151.2 g (approximately 100% yield) of a black product. Elemental analysis gave a composition of 71.93% S, 2.41% Cl, 0.52% H and 22.5% C. This composition corresponds to 16.8 wt % of carbon fibers in the polysulfide polymer/carbon fiber composite.

Example 5

A polysulfide-containing polymer/non-activated carbon nanofiber composite was prepared according to the following procedure. Sulfur (89.8 g) was added to a solution of 90.2 g of $Na_2S.9H_2O$ in 700 mL of H2O. The mixture was stirred at room temperature for 2 hours, and then at 50° C. until all the sulfur dissolved. The reaction mixture was heated to 95° C., and 20 g of carbon nanofibers (PYROGRAF-III, a tradename for carbon nanofibers available from Applied Sciences, Inc., Cedarville, Ohio) was added in one portion. The mixture was stirred for 10 minutes, and then 63.6 g of hexachlorocyclopentadiene was added over 1 hour. The mixture was then stirred at 95–98° C. for 15 hours. The polysulfide polymer/carbon nanofiber composite was then filtered and washed in a beaker with water and subsequently with acetone. The product was dried under vacuum for 10 hours at 80° C. Elemental analysis gave a composition of 75.1% S, 0.3% Cl, 0.1% H and 24.5% C. This composition corresponds to 14.2 wt % of carbon nanofibers in the polysulfide polymer/carbon fiber composite.

Example 6

A polysulfide-containing polymer composite was prepared from hexachlorocyclopentadiene and vanadium oxide aerogel according to the following procedure. Sulfur (76.94 g) was added to a solution of 144.04 g of $Na_2S.9H_2O$ in 600 mL of $H_2O$ under argon. The suspension was stirred for 2 hours at room temperature and 2 hours at 50° C. until all sulfur dissolved. The solution was then heated to 95° C., and 60 g of vanadium oxide aerogel powder (produced from vanadium acetylacetonate) was added in one portion and stirred for 3 minutes. Hexachlorocyclopentadiene (54.55 g) was added over 30 minutes followed by stirring at 98° C. for 8.5 hours. The composite mixture was filtered, washed with water and subsequently with acetone, and then dried in vacuum for 10 hours at 80° C. The yield was 160.8 g (95.6%) with an elemental composition of 54.29% S, 8.54% C, 0.36% H, 34.04% V, and <0.03% Cl.

Example 7

A polysulfide-containing copolymer was prepared from hexachlorocyclopentadiene and 1,2,3-trichloropropane according to the following procedure. Sulfur (102.6 g) was added to a sodium sulfide hydrate solution (60–62% $Na_2S$, 102.4 g) in 0.9 L of water and stirred for 24 hours at 60° C. until all the solids dissolved. A mixture of hexachlorocyclopentadiene (36.4 g) and trichloropropane (39.3 g, Aldrich Chemical Company, Milwaukee, Wis.) was then added to the solution over a period of 1 hour at 100° C. The reaction mixture was stirred for 17 hours at 95° C. A black fibrous polymer was filtered from the reaction mixture, washed with water and acetone, and dried in vacuum at 70° C. The yield was 132.4 g (90%) with an elemental composition of 11.5% C, 85.75% S, <0.02% Cl, and 0.53% H.

Example 8

A polysulfide-containing copolymer was prepared from hexachlorocyclopentadiene and 1,2,3,4,5-pentachloro-5-(1, 2,3,4,5-pentachlorocylcopenta-2,4-dienyl)cylcopenta-1,3-diene according to the following procedure. Anhydrous sodium sulfide (50.53 g) and sulfur (41.5 g) was stirred for 28 hours in 1.25 L of anhydrous dimethylformamide at 80° C. until all the solids dissolved. A solution of 1,2,3,4,5-pentachloro-5-(1,2,3,4,5-pentachlorocyclopenta-2,4-dienyl)cyclopenta-1,3-diene (30.47 g, Velsicol Chemical Corporation, Rosemont, Ill.) and hexachlorocyclopentadiene (29.44 g) in 60 mL of tetrahydrofuran/dimethylformamide (2:1 by volume) was added to this solution over a period of 70 minutes at 80° C. The reaction mixture was stirred for 38 hours at 80° C., and then diluted with 500 mL of methanol and filtered. The black polymer powder product was washed subsequently with acetone, 1% acetic acid in water, water, and, finally, with acetone, and dried in vacuum at 70° C. The yield was 73.9 g (97%) with an elemental composition of 17.9% C, 80.3% S, and 0.47% Cl.

Example 9

Composite cathodes were fabricated from polysulfide polymer prepared as described in Example 2. The polymer was first ground to disperse any clumping of the polymer particles. A cathode slurry was prepared with a formulation of 70% polysulfide polymer, 10% conductive carbon pigment (PRINTEX XE-2, a tradename for a carbon pigment available from Degussa Corporation, Akron, Ohio), 5% non-activated carbon nanofibers (PYROGRAF-III, a tradename for carbon nanofibers available from Applied Sciences, Inc., Cedarville, Ohio), 5% $SiO_2$ (AEROSIL 380, a tradename for silica available from Degussa Corporation, Akron, Ohio) and 10% polyethylene oxide (PEO with a molecular weight of 5,000,000 available from Polysciences Inc., Warrington, Pa.) by weight, dispersed in a mixed solvent of water and n-propanol (80:20 by volume) in a ball mill jar containing ceramic cylinders. The solids content of the slurry was 12 wt %. The mixture was ball milled for 20 hours. The slurry was cast (hand draw with a gap coater bar) onto both sides of a 17.5 µm thick conductive carbon coated aluminum foil (Product No. 60303 available from Rexam Graphics, South Hadley, Mass.) as a current collector. The coating was dried under ambient conditions overnight, and then under vacuum at 60° C. for one hour. The resulting dry cathode coating had a thickness in the range of 20 to 25 µm on each side of the current collector, with a density or loading of electroactive polysulfide polymer of about 1.64 mg/cm² per side. The volumetric density of the polysulfide polymer in the composite cathode layer was in the range of 377 to 393 mg/cm³.

Example 10

Wound AA size cells were fabricated from composite cathodes prepared as described in Example 9 with a 75 µm lithium anode and a 25 µm E25 SETELA (a tradename for a polyolefin separator available from Tonen Chemical Corporation, Tokyo, Japan, and also available from Mobil Chemical Company, Films Division, Pittsford, N.Y.) separator. The cells were filled with a liquid electrolyte (50% 1,3-dioxolane, 35% diglyme, 10% dimethoxyethane (DME) and 5% o-xylene by volume with 1.0 M lithium triflate salt (3M Corporation, St. Paul, Minn.)). Cells were cycled at a rate of charge and discharge of 0.25 mA/cm² and 0.40 mA/cm², respectively. Cell performance data at 25° C. showed that the polysulfide polymer cathodes had excellent capacity with a total capacities of about 566 mAh and specific capacities of more than 830 mAh/g at the 5th cycle. The cathodes also demonstrated good capacity stability out to 100 cycles.

Example 11

Composite polysulfide polymer (prepared as described in Example 2) containing cathodes were prepared by the method and with the composition described in Example 9. The resulting dry cathode coating had a thickness of about 20 to 25 µm on each side of the current collector, with a density or loading of polysulfide polymer in the range of 0.63 to 0.97 mg/cm². The volumetric density of the polysulfide polymer in the composite cathode layer was around 319 to 385 mg/cm³.

Wound AA size cells were fabricated from these cathodes with a 75 µm lithium anode and a 25 µm E25 SETELA separator. The cells were filled with a liquid electrolyte (50% 1,3-dioxolane, 20% diglyme, 10% sulfolane and 20% dimethoxyethane by volume with 1.0 M lithium triflate salt). The cell were cycled at a rate of charge and discharge of C/3 (0.2 mA/cm²) and C/2 (0.33 mA/cm²) respectively. Cell performance data at 25° C. (FIG. 1) showed that the polysulfide polymer cathode had excellent capacity and good stability, with specific capacities of: about 1000 mAh/g for the first 10 cycles and 700 mAh/g at the 100th cycle. The cells showed a low rate of capacity loss with cycling with a value of around 0.29% per cycle.

Example 12

A polysulfide polymer (prepared as described in Example 2) containing composite cathode was prepared with the following composition (dry weight basis): 65% polysulfide polymer, 10% PRINTEX XE-2, 15% activated carbon fiber (carbonized hydrated cellulose as described in Chemical Abstracts, Columbus, Ohio, Abstract Nos. 110:117317q and 110:12905k), 5% $SiO_2$ and 5% polytetrafluoroethylene binder (TEFLON®, a tradename for PTFE polymer available from DuPont Corporation, Wilmington, Del.) by a standard paste method. The cathode paste was formed using isopropanol as the solvent in a small Eiger sand mill, and extruded onto a 175 µm aluminum EXMET (Exmet Corporation, Naugatuck, Conn.) current collector by the Rondo extrusion technique. Cathodes were dried for 1 hour at 60° C. under vacuum. The resulting dry cathode coating had a total thickness in the range of 200 µm, with a density or loading of polysulfide polymer of about 4 mg/cm². The volumetric density of the electroactive polysulfide polymer material in the composite cathode was 300 mg/cm³.

Figure 4:
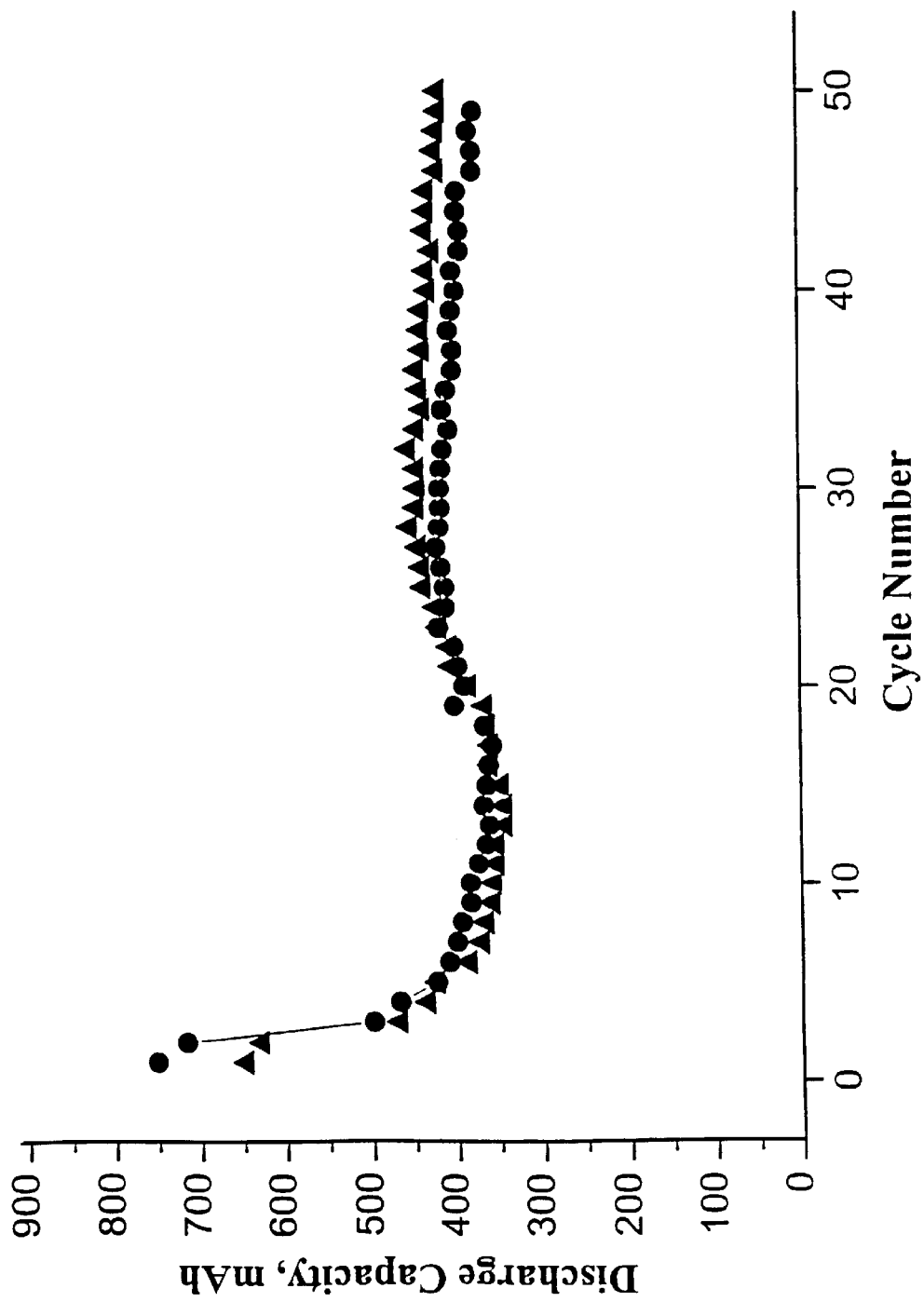
FIG. 4 shows a plot of cell capacity versus cycle number for a AA lithium battery cell comprising a cathode containing 65 wt % polysulfide polymer as described in Example 12.

Wound AA cells were assembled with the above cathodes, a 25 µm E25 SETELA separator, and a 100 µm lithium foil anode. The cells were filled with a liquid electrolyte (50% 1,3-dioxolane, 45% dimethoxyethane and 5% o-xylene by volume with 1.0 M lithium triflate salt). Cells were cycled at a rate of charge and discharge of 0.44 mA/cm² and 0.73 mA/cm² respectively. Cell performance data for two cells at 25° C. is shown in FIG. 4. The cells with the polysulfide polymer composite cathodes had excellent capacity specific capacity, with a specific capacity at the $5^{th}$ cycle of more than 875 mAh/g. The cathodes also demonstrated good capacity stability upon further cycling.

Example 13

A polysulfide polymer (prepared as described in Example 2) cathode slurry was prepared by the method described in Example 9 from a slurry with a formulation of 83% polysulfide polymer, 10% PRINTEX XE-2 conductive carbon, 2% PYROGRAF-II carbon nanofibers, 4% poly(acrylamide-co-diallyldimethylammonium chloride (available from Aldrich Chemical Company, Milwaukee, Wis.), and 1% PEO by weight with water as the solvent. The slurry had a solids content of 12.0 wt %. The slurry was cast (hand draw with a gap coater bar) onto both sides of a 17.5 µm thick conductive carbon coated aluminum foil (Product No. 60303, Rexam Graphics) as a current collector. The coatings were dried under ambient conditions overnight, and then under vacuum at 60° C. for one hour. The resulting dry cathode coating had a thickness of about 22 µm on each side of the current collector, with a density of electroactive polysulfide polymer of about 1.1 mg/cm². The volumetric density of the electroactive polysulfide polymer in the composite cathode was around 485 mg/cm³.

Wound AA size cells were fabricated from these cathodes with a 50 μm thick lithium anode and a 25 μm E25 SETELA separator. The cells were filled with a liquid electrolyte (50% 1,3-dioxolane, 45% dimethoxyethane (DME), and 5% o-xylene of this volume with 1.0 M lithium imide salt). The cells were cycled at a rate of charge and discharge of C/2 (0.35 mA/cm²) and C/1.5 (0.49 mA/cm²) respectively. Cell performance data showed that these carbon-sulfur polymer composite cathodes had excellent specific capacity and stability under these conditions, similar to the cell data shown in FIG. 1.

Example 14

A polysulfide copolymer (prepared as described in Example 7) containing composite cathode was prepared with the following composition: 75% polysulfide copolymer, 10% PRINTEX XE-2, 5% SiO₂ (AEROSIL 380), and 10% PEO (molecular weight 5,000,000) by weight. Composite cathodes were prepared from a slurry made by the method described in Example 9. The cathode layer thickness was 30 μm. Tile density or loading of electroactive polysulfide copolymer in the cathode was about 1.5 mg/cm². The volumetric density of the electroactive polysulfide copolymer in the composite cathode was around 500 mg/cm³.

Wound AA cells were assembled from the copolymer containing composite cathode with a 75 μm lithium foil anode and a 25 μm E25 SETELA separator. The cells were filled with a liquid electrolyte (1.0 M lithium triflate solution in a 50% 1,3-dioxolane, 45% dimethoxyethane and 5% o-xylene by volume solution). Cells were cycled at a 0.33 mA/cm² charge rate and a 0.5 mA/cm² discharge rate. Cell performance data demonstrated good cycling stability over 45 cycles, with an average specific capacity of 325 mAh/g.

Example 15

A composite paste cathode with a composition by weight of 65% of a carbon-sulfur polymer made by the process described in Example 2, 10% conductive carbon pigment (PRINTEX XE-2), 20% PYROGRAF-III carbon nanofibers; 5% SiO₂ (AEROSIL 380), and 5% PTFE was prepared by following method.

The carbon-sulfur polymer was pre-ground in a IKA grinder to disperse any clumping of the polymer particles. The carbon nanofibers were ground in a coffee mill grinder for 6 seconds to disperse any clumping of the filaments. The carbon-sulfur polymer, conductive carbon, and SiO₂ were then added and ground with the filaments for 4 seconds in the same grinder. The coating paste was prepared by adding to this dry mixture water/isopropanol (4:1 by volume) in a Kitchen Aid bowl and mixing for about 5 minutes. After the mixture showed an even distribution of the solid constituents, polytetrafluoroethylene emulsion (60% PTFE in water emulsion available from DuPont Corporation, Wilmington, DE) was added, and the mixture stirred for 5 minutes. The solids content of the paste was 18%. The paste was coated on one side of an aluminum EXMET (Exmet Corporation, Naugatuck, Conn.) using a stainless steel spatula and dried in an oven at 60° C. for 1 hour. The composite cathode had a total thickness of 216 to 265 μm with a total loading of polysulfide polymer of 3.3 to 4.2 mg/cm².

Figure 5:
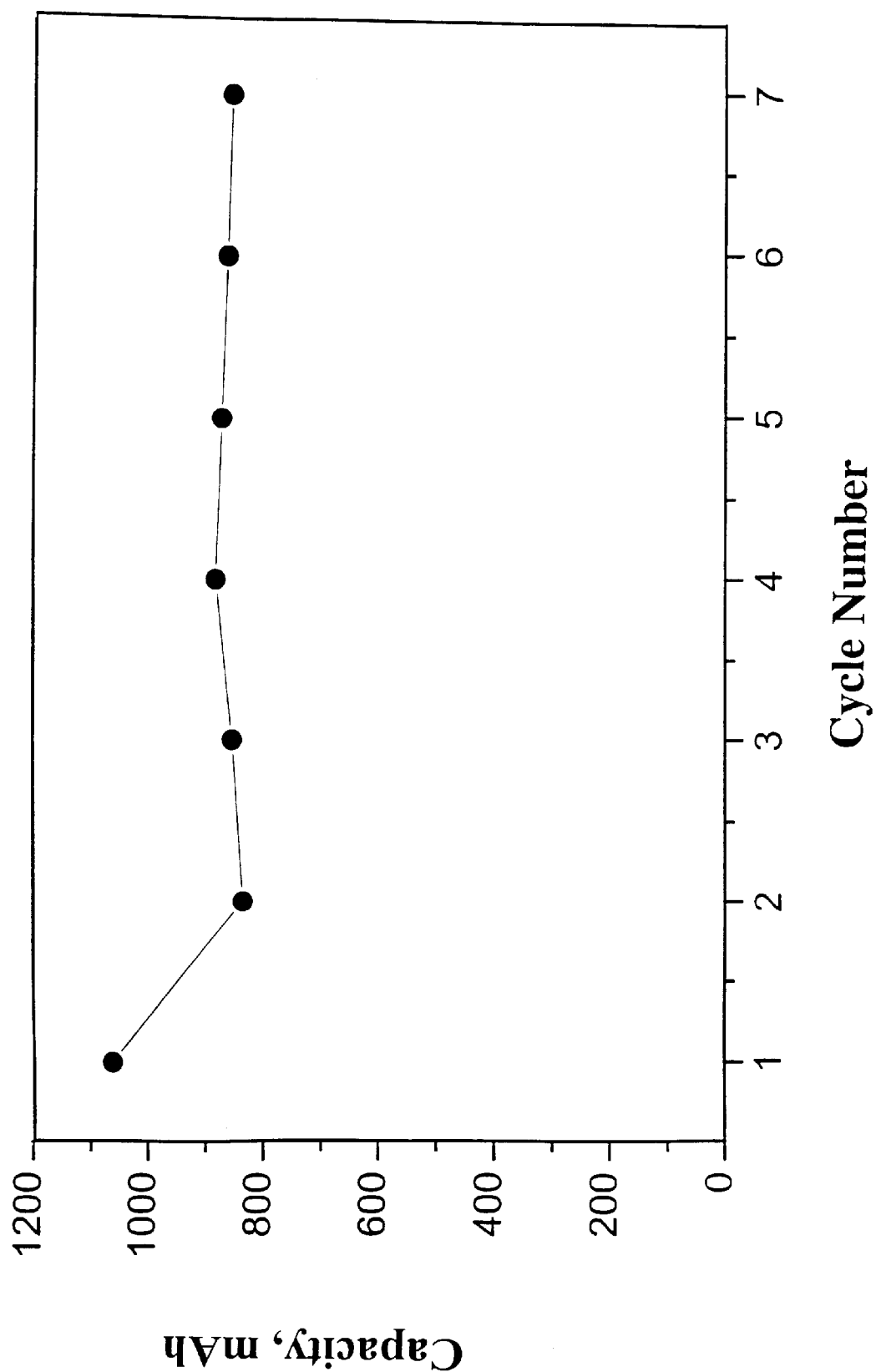
FIG. 5 shows a plot of cell capacity versus cycle number for a AA lithium battery cell comprising a paste cathode containing 65 wt % polysulfide polymer as described in Example 15.

Wound AA size cells were fabricated with the above composite cathodes, 100 μm lithium anode and a 25 μm E25 SETELA separator. The cells were filled with a liquid electrolyte (50% 1,3-dioxolane, 45% dirnethoxyethane and 5% o-xylene) with 1.3 M Li triflate salt. The cells were cycled at a rate of charge and discharge of 0.33 mA/cm² and 0.72 mA/cm² respectively. Cell performance data for one cell is shown in FIG. 5. The composite cathode comprising the carbon-sulfur polymer and carbon nanofibers had excellent capacity and stability, with a total cell capacity at the 5$^{th}$ cycle of 872 mAh and a specific capacity of 894 mAh/g.

While the invention has been described in detail and with reference to specific embodiments thereof, it will be apparent to one skilled in the art that various chances and modifications can be made without departing from the spirit and scope thereof.

What is claimed is:

1. A method for preparing an electroactive, energy-storing, highly crosslinked organic polymer, said method comprising the steps of:

(a) providing a solution or suspension of an alkali metal polysulfide of formula $M_2S_m$ in a liquid medium, wherein M is an alkali metal selected from the group consisting of lithium, sodium, potassium, and cesium, and m is an integer from 3 to 10;

(b) adding to the solution or suspension of step (a) a halogen substituted precursor comprising a non-aromatic carbocycle, wherein said halogen substituted precursor comprises one or more materials selected from the group consisting of hexachlorocyclopentadiene, octachlorocyclopentadiene, 1,2,3,3,5,5-hexachloro-4-(dichloromethylene)-1-cyclopentene, and 1,2,3,4,5-pentachloro-5-(1,2,3,4,5-pentachlorocyclopenta-2,4-dieniyl)cyclopenta-1,3-diene;

(c) stirring and heating said mixture of step (b), thereby reacting said alkali metal polysulfide with said halogen substituted carbocyclic compound to form an electroactive, energy-storing, highly crosslinked organic polymer; and, (d) separating the polymer from the reaction medium.

2. The method of claim 1, wherein the mixture of step (c) is heated at a temperature between 20° C. and 100° C.

3. The method of claim 1, wherein said liquid medium comprises water.

4. The method of claim 1, wherein said liquid medium consists of water.

5. The method of claim 1, said method further comprising after step (d), one or more steps of:

(e) purifying the polymer after isolation; and, (f) drying the polymer.

6. A method for preparing an electroactive, energy-storing, highly crosslinked organic polymer, which polymer comprises a plurality of non-aromatic carbocyclic repeat units which are covalently linked via polysulfide linkages;

each of said carbocyclic repeat units comprising a carbocycle having from 3 to 12 ring carbon atoms and from 3 to 22 covalent linkages to adjacent carbocyclic repeat units; and, each of said polysulfide linkages comprising a divalent polysulfide moiety having the formula, —$(S_m)$—, wherein m is an integer from 3 to 10 and is the same or different at each occurrence;

the method comprising:

(a) providing a solution or suspension of an alkali metal polysulfide of formula $M_2S_m$ in a liquid medium, wherein M is an alkali metal selected from the group consisting of lithium, sodium, potassium, and cesium, and m is an integer from 3 to 10;

(b) adding to the solution or suspension of step (a) a halogen substituted precursor comprising a non-aromatic carbocycle, wherein said halogens are selected from the group consisting of: chlorine, bromine and iodine, and said carbocycle comprises from 3 to 12 ring carbon atoms;

(c) stirring and heating said mixture of step (b), thereby reacting said alkali metal polysulfide with said halogen substituted carbocyclic compound to form an electroactive, energy-storing, highly crosslinked organic polymer; and, (d) separating the polymer from the reaction medium.

7. A method for preparing an electroactive, energy-storing, highly crosslinked organic polymer, which polymer comprises polymeric segments of the formula

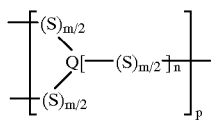

wherein:
Q denotes a non-aromatic carbocyclic repeat unit comprising a carbocycle having from 3 to 12 ring carbon atoms;
S denotes a sulfur atom;
m is the number of sulfur atoms in a given polysulfide linkage, is an integer from 3 to 10 and is the same or different at each occurrence;
n denotes the number of crosslinking polysulfide linkages, is an integer from 1 to 20 and is the same or different at each occurrence; and,
p is an integer greater than 1;
the method comprising:
(a) providing a solution or suspension of an alkali metal polysulfide of formula $M_2S_m$ in a liquid medium, wherein M is an alkali metal selected from the group consisting of lithium, sodium, potassium, and cesium, and m is an integer from 3 to 10;
(b) adding to the solution or suspension of step (a) a halogen substituted precursor comprising a non-aromatic carbocycle, wherein said halogens are selected from the group consisting of: chlorine, bromine and iodine, and said carbocycle comprises from 3 to 12 ring carbon atoms;
(c) stirring and heating said mixture of step (b), thereby reacting said alkali metal polysulfide with said halogen substituted carbocyclic compound to form an electroactive, energy-storing, highly crosslinked organic polymer; and,
(d) separating the polymer from the reaction medium.

8. A method for preparing an electroactive, energy-storing, highly crosslinked organic polymer,
which polymer comprises two or more different non-aromatic carbocyclic repeat units which are covalently linked via polysulfide linkages;
each of said carbocyclic repeat units comprising a carbocycle having from 3 to 12 ring carbon atoms and from 3 to 20 covalent linkages to adjacent carbocyclic repeat units; and,
each of said polysulfide linkages comprising a divalent polysulfide moiety having the formula, —$(S_m)$—, wherein m is an integer from 3 to 10 and is the same or different at each occurrence;
the method comprising:
(a) providing a solution or suspension of an alkali metal polysulfide of formula $M_2S_m$ in a liquid medium, wherein M is an alkali metal selected from the group consisting of lithium, sodium, potassium, and cesium, and m is an integer from 3 to 10;
(b) adding to the solution or suspension of step (a) a halogen substituted precursor comprising a non-aromatic carbocycle, wherein said halogens are selected from the group consisting of: chlorine, bromine and iodine, and said carbocycle comprises from 3 to 12 ring carbon atoms;
(c) stirring and heating said mixture of step (b), thereby reacting said alkali metal polysulfide with said halogen substituted carbocyclic compound to form an electroactive, energy-storing, highly crosslinked organic polymer; and,
(d) separating the polymer from the reaction medium.

9. A method for preparing an electroactive, energy-storing, highly crosslinked organic polymer,
which polymer comprises non-aromatic carbocyclic repeat units and non-carbocyclic repeat units which are covalently linked via polysulfide linkages;
each of said carbocyclic repeat units comprising a carbocycle having from 3 to 12 ring carbon atoms and from 3 to 20 covalent linkages to one or more adjacent carbocyclic or non-carbocyclic repeat units; and,
each of said polysulfide linkages comprising a divalent polysulfide moiety having the formula —$(S_m)$—, wherein m is an integer from 3 to 10 and is the same or different at each occurrence;
the method comprising:
(a) providing a solution or suspension of an alkali metal polysulfide of formula $M_2S_m$ in a liquid medium, wherein M is an alkali metal selected from the group consisting of lithium, sodium, potassium, and cesium, and m is an integer from 3 to 10;
(b) adding to the solution or suspension of step (a) a halogen substituted precursor comprising a non-aromatic carbocycle, wherein said halogens are selected from the group consisting of: chlorine, bromine and iodine, and said carbocycle comprises from 3 to 12 ring carbon atoms;
(c) stirring and heating said mixture of step (b), thereby reacting said alkali metal polysulfide with said halogen substituted carbocyclic compound to form an electroactive, energy-storing, highly crosslinked organic polymer; and,
(d) separating the polymer from the reaction medium.

* * * * *